(12) United States Patent
Okamoto et al.

(10) Patent No.: US 11,964,423 B2
(45) Date of Patent: Apr. 23, 2024

(54) METHOD FOR MANUFACTURING THREE-DIMENSIONAL SHAPED OBJECT AND THREE-DIMENSIONAL SHAPING APPARATUS

(71) Applicant: Seiko Epson Corporation, Tokyo (JP)

(72) Inventors: Eiji Okamoto, Matsumoto (JP); Akihiko Tsunoya, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/652,147

(22) Filed: Feb. 23, 2022

(65) Prior Publication Data

US 2022/0274316 A1    Sep. 1, 2022

(30) Foreign Application Priority Data

Feb. 26, 2021   (JP) ................................ 2021-029760

(51) Int. Cl.
*B29C 64/106* (2017.01)
*B29C 64/209* (2017.01)
(Continued)

(52) U.S. Cl.
CPC .......... *B29C 64/106* (2017.08); *B29C 64/209* (2017.08); *B29C 64/295* (2017.08); *B29C 64/314* (2017.08); *B29C 64/321* (2017.08); *B33Y 10/00* (2014.12); *B33Y 30/00* (2014.12); *B33Y 40/10* (2020.01); *B33Y 70/00* (2014.12);
(Continued)

(58) Field of Classification Search
CPC ... B29C 64/106; B29C 64/314; B29C 64/321; B29C 64/295; B29C 64/209; B29C 2793/0027; B29K 2101/12; B29K 2105/08; B29K 2105/12

See application file for complete search history.

(56) References Cited

U.S. PATENT DOCUMENTS 10,076,876 B2 *   9/2018   Mark ..................... B29C 48/92
2017/0210074 A1   7/2017   Ueda et al.
(Continued)

FOREIGN PATENT DOCUMENTS

CN   111231306       6/2020
JP   2019-098569     6/2019
(Continued)

*Primary Examiner* — Alison L Hindenlang
*Assistant Examiner* — Erica Hartsell Funk
(74) *Attorney, Agent, or Firm* — WORKMAN NYDEGGER

(57) ABSTRACT

A method for manufacturing a three-dimensional shaped object according to the present disclosure includes: a plasticizing step of plasticizing at least a part of a shaping material including a first fiber material and a thermoplastic resin to generate a plasticized material to be discharged from a nozzle opening for shaping a three-dimensional shaped object; a fiber introducing step including either a step of introducing a second fiber material longer than the first fiber material into the shaping material or the plasticized material before being discharged from the nozzle opening, or a step of introducing the second fiber material into the plasticized material after being discharged from the nozzle opening; and a shaping step of shaping the three-dimensional shaped object including the first fiber material and the second fiber material.

8 Claims, 20 Drawing Sheets

(51) Int. Cl.
| | |
|---|---|
| *B29C 64/295* | (2017.01) |
| *B29C 64/314* | (2017.01) |
| *B29C 64/321* | (2017.01) |
| *B33Y 10/00* | (2015.01) |
| *B33Y 30/00* | (2015.01) |
| *B33Y 40/10* | (2020.01) |
| *B33Y 70/00* | (2020.01) |
| *B29K 101/12* | (2006.01) |
| *B29K 105/08* | (2006.01) |
| *B29K 105/12* | (2006.01) |

(52) U.S. Cl.
CPC .. *B29C 2793/0027* (2013.01); *B29K 2101/12* (2013.01); *B29K 2105/08* (2013.01); *B29K 2105/12* (2013.01)

(56) References Cited

U.S. PATENT DOCUMENTS

| | | | |
|---|---|---|---|
| 2019/0160746 A1* | 5/2019 | Anegawa | B33Y 70/10 |
| 2019/0202117 A1* | 7/2019 | Alfson | B29C 64/209 |
| 2020/0164589 A1* | 5/2020 | Yuwaki | B22F 10/22 |
| 2020/0398469 A1 | 12/2020 | Yuwaki | |
| 2021/0178701 A1 | 6/2021 | Yuwaki et al. | |
| 2022/0347935 A1 | 11/2022 | Yuwaki et al. | |

FOREIGN PATENT DOCUMENTS

| | | |
|---|---|---|
| JP | 2021-000754 | 1/2021 |
| WO | 2015-182675 | 12/2015 |
| WO | 2019/114709 | 6/2019 |

\* cited by examiner

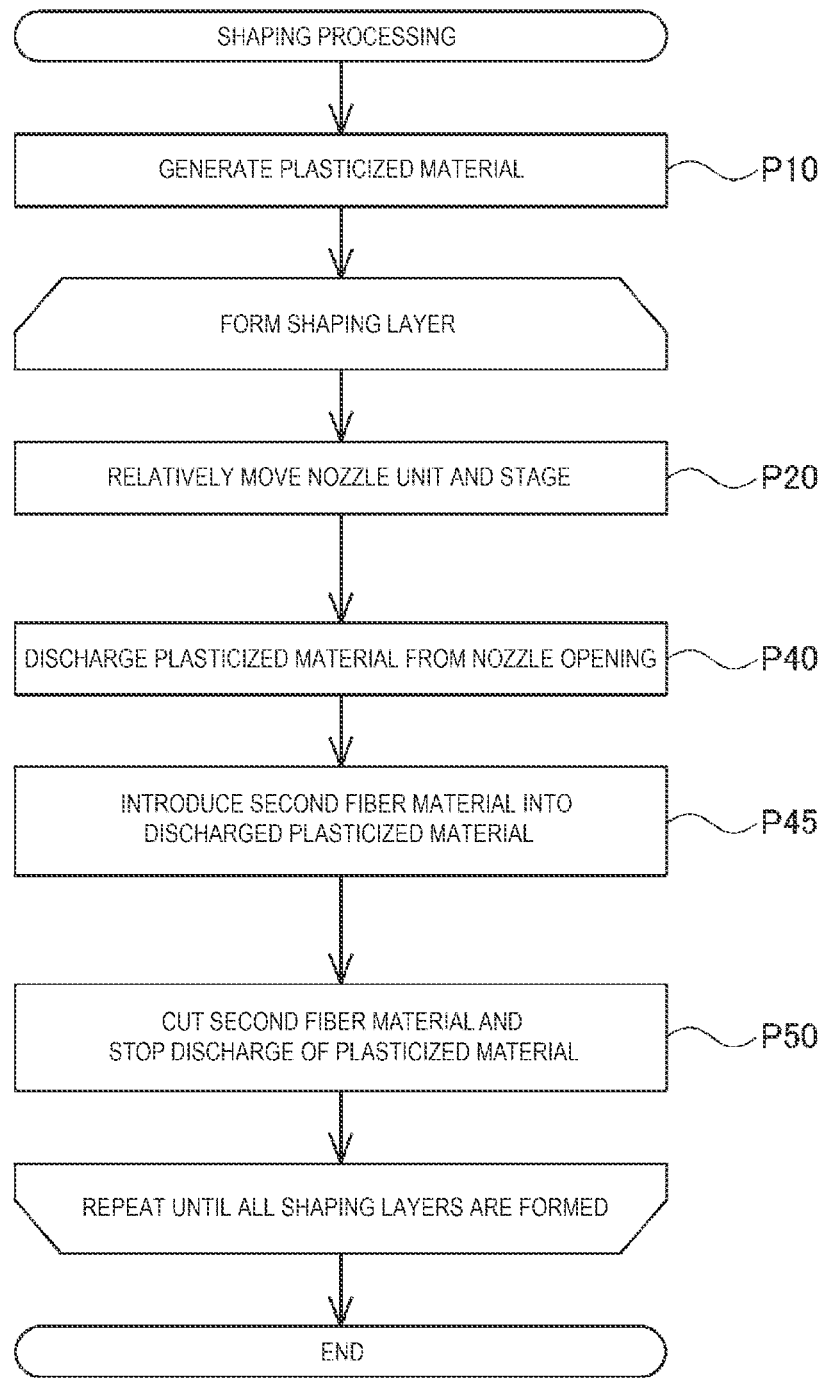

METHOD FOR MANUFACTURING THREE-DIMENSIONAL SHAPED OBJECT AND THREE-DIMENSIONAL SHAPING APPARATUS

The present application is based on, and claims priority from JP Application Serial Number 2021-029760, filed Feb. 26, 2021, the disclosure of which is hereby incorporated by reference herein in its entirety.

BACKGROUND

1. Technical Field

The present disclosure relates to a method for manufacturing a three-dimensional shaped object and a three-dimensional shaping apparatus.

2. Related Art

Various manufacturing methods are known for shaping a three-dimensional shaped object by ejecting a plasticized material, which is generated by plasticizing a thermoplastic resin, onto a stage from a nozzle. For example, the following WO15/182675 discloses a technique of shaping a three-dimensional shaped object including a fiber material inside by introducing the fiber material such as carbon fiber into a thermoplastic resin, which is generated by heating and softening the thermoplastic resin such as a filament, and ejecting the fiber material from a nozzle. According to the technique of WO15/182675, strength of the three-dimensional shaped object can be increased by introducing the fiber material into the inside of the three-dimensional shaped object.

According to the technique of WO15/182675, when the three-dimensional shaped object is shaped by introducing a linear continuous fiber material, strength of the fiber material in a length direction can be easily improved. However, strength of the fiber material in a direction intersecting the length direction may not be sufficiently improved. As described above, in the technique of shaping a three-dimensional shaped object by introducing a fiber material, there is still room for improvement in improving the strength of the three-dimensional shaped object in various directions.

SUMMARY

The present disclosure is intended to solve the above-described problem, and can be realized as the following application examples.

A method for manufacturing a three-dimensional shaped object according to an application example of the present disclosure includes: a plasticizing step of plasticizing at least a part of a shaping material including a first fiber material and a thermoplastic resin to generate a plasticized material to be discharged from a nozzle opening for shaping a three-dimensional shaped object; a fiber introducing step including either a step of introducing a second fiber material longer than the first fiber material into the shaping material or the plasticized material before being discharged from the nozzle opening, or a step of introducing the second fiber material into the plasticized material after being discharged from the nozzle opening; and a shaping step of shaping the three-dimensional shaped object including the first fiber material and the second fiber material.

In a method for manufacturing a three-dimensional shaped object according to another application example of the present disclosure, the shaping step includes: a first shaping step of forming a first portion that is a part of the three-dimensional shaped object and that includes the first fiber material and the second fiber material; and a second shaping step of forming a second portion that is a part of the three-dimensional shaped object and that includes the first fiber material and does not include the second fiber material.

In a method for manufacturing a three-dimensional shaped object according to another application example of the present disclosure, the shaping step includes: a moving step of relatively moving a stage configured to support the three-dimensional shaped object and a nozzle unit having the nozzle opening; and an introduction speed control step of changing an introduction speed at which the second fiber material is introduced into the shaping material or the plasticized material in accordance with a relative movement speed between the nozzle unit and the stage in the moving step.

In a method for manufacturing a three-dimensional shaped object according to another application example of the present disclosure, the plasticizing step includes, in a plasticizing apparatus that includes a flat screw having a groove forming surface in which a groove portion is formed, a facing portion that has a facing surface facing the groove forming surface and that is formed with a communication hole communicating with the nozzle opening, and a heater configured to heat the flat screw or the facing portion, a step of guiding the shaping material supplied between the flat screw and the facing portion to the communication hole while plasticizing the shaping material by rotation of the flat screw and heating of the heater.

In a method for manufacturing a three-dimensional shaped object according to another application example of the present disclosure, the flat screw has a through hole that is opened in the groove forming surface and that communicates with the communication hole. The fiber introducing step includes a step of introducing the second fiber material into the plasticized material before being discharged from the nozzle opening through the through hole.

A method for manufacturing a three-dimensional shaped object according to another application example of the present disclosure includes a pressure control step of controlling a pressure in the through hole to be higher than a pressure in the communication hole.

In a method for manufacturing a three-dimensional shaped object according to another application example of the present disclosure, the groove forming surface or the facing surface has an introduction groove that guides the second fiber material from a side of the flat screw or the facing portion to the communication hole. The fiber introducing step includes a step of introducing the second fiber material into the shaping material through the introduction groove.

A method for manufacturing a three-dimensional shaped object according to another application example of the present disclosure includes a cutting step of cutting the second fiber material.

In a method for manufacturing a three-dimensional shaped object according to another application example of the present disclosure, the cutting step includes a step of cutting the second fiber material by operating a discharge amount control mechanism that is provided upstream from the nozzle opening and that controls a discharge amount of the plasticized material.

In a method for manufacturing a three-dimensional shaped object according to another application example of the present disclosure, the discharge amount control mechanism is driven by a motor. The fiber introducing step includes a step of transmitting a driving force generated by the motor to a conveying unit of the second fiber material and using the driving force as a conveying force to convey the second fiber material.

A three-dimensional shaped object according to an application example of the present disclosure includes: a plasticizing unit configured to plasticize at least a part of a shaping material including a first fiber material and a thermoplastic resin to generate a plasticized material for shaping a three-dimensional shaped object; a discharging unit having a nozzle opening for discharging the plasticized material; a fiber introducing unit having either a function of introducing a second fiber material longer than the first fiber material into the shaping material or the plasticized material before being discharged from the nozzle opening, or a function of introducing the second fiber material into the plasticized material after being discharged from the nozzle opening; and a control unit configured to control the plasticizing unit, the discharging unit, and the fiber introducing unit to shape the three-dimensional shaped object including the first fiber material and the second fiber material.

BRIEF DESCRIPTION OF THE DRAWINGS

FIG. 22 is a flowchart showing steps executed in shaping processing according to the ninth embodiment.

DESCRIPTION OF EXEMPLARY EMBODIMENTS

Figure 1:
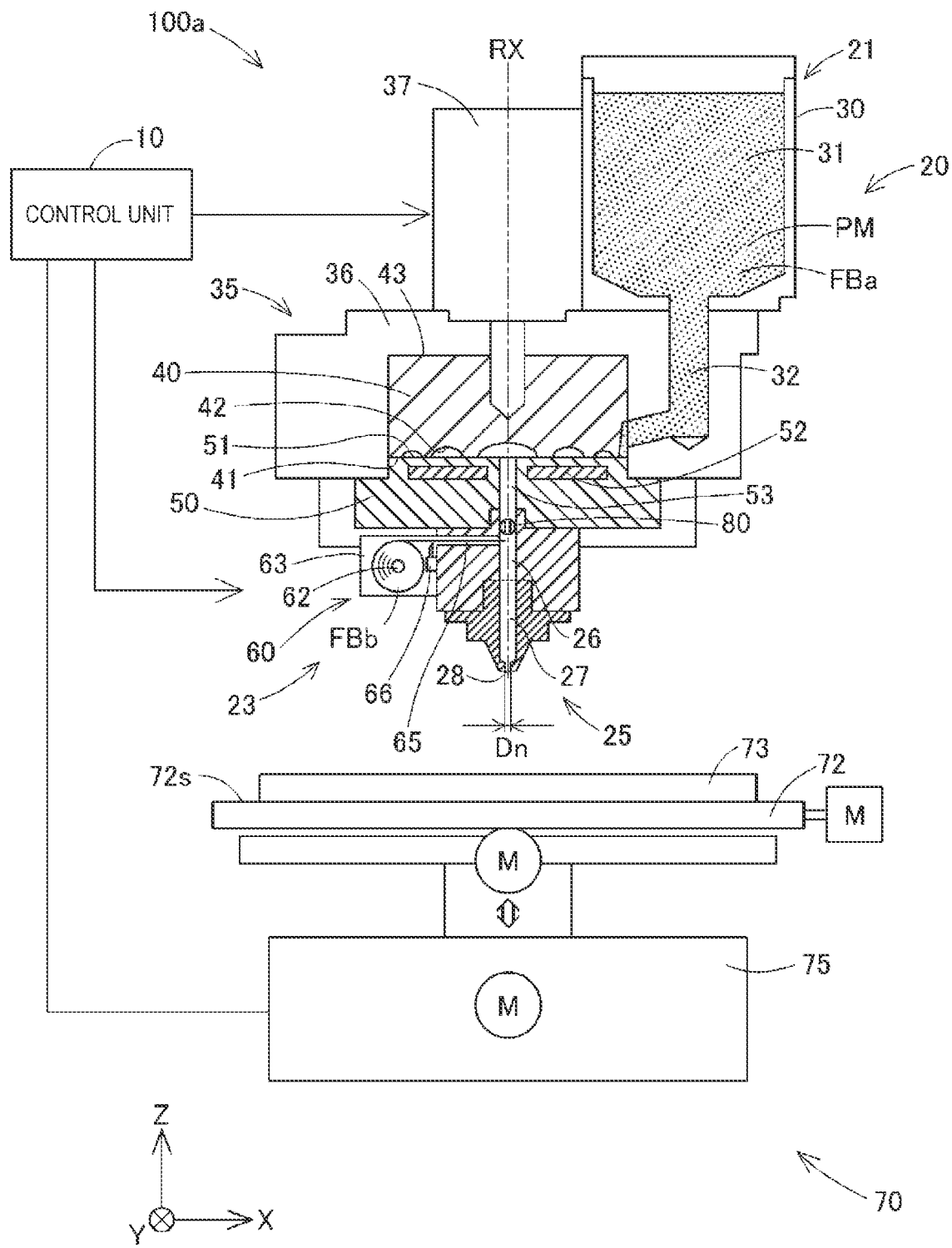
FIG. 1 is a schematic diagram showing a configuration of a three-dimensional shaping apparatus according to a first embodiment.

Hereinafter, a method for manufacturing a three-dimensional shaped object and a three-dimensional shaping apparatus according to the present disclosure will be described in detail based on embodiments shown in the drawings.

1 First Embodiment

FIG. 1 is a schematic diagram showing a configuration of a three-dimensional shaping apparatus 100a that executes a method for manufacturing a three-dimensional shaped object according to a first embodiment. FIG. 1 shows arrows indicating X, Y, and Z directions orthogonal to one another. The X direction and the Y direction are directions parallel to a horizontal plane, and the Z direction is a direction opposite to a gravity direction. The arrows indicating the X, Y, and Z directions are also shown in other drawings to be referred as necessary so as to correspond to FIG. 1.

The three-dimensional shaping apparatus 100a includes a control unit 10, a discharging unit 20, and a shaping stage unit 70. Under control of the control unit 10, the discharging unit 20 laminates shaping layers formed by discharging a plasticized material to the shaping stage unit 70, so that the three-dimensional shaping apparatus 100a shapes a three-dimensional shaped object. Hereinafter, the "three-dimensional shaped object" is also simply referred to as a "shaped object", and the "three-dimensional shaping apparatus" is also referred to as a "shaping apparatus".

The control unit 10 controls an operation of the entire shaping apparatus 100a to execute shaping processing of shaping a shaped object. In the first embodiment, the control unit 10 is a computer including one or a plurality of processors (CPUs) and a main storage device (RAM). By the processor executing programs and commands read into the main storage device, the control unit 10 exerts various functions. At least a part of the functions of the control unit 10 may be implemented by a hardware circuit.

The discharging unit 20 includes a material generation unit 21, a fiber introducing unit 23, and a nozzle unit 25. The material generation unit 21 plasticizes at least a part of a shaping material PM including a first fiber material FBa and a thermoplastic resin to generate a plasticized material. The first fiber material FBa and the plasticized material will be described later. The fiber introducing unit 23 introduces a second fiber material FBb into the plasticized material generated by the material generation unit 21. The second fiber material FBb will be described later. The nozzle unit 25 discharges the plasticized material. More detailed configurations of the material generation unit 21, the nozzle unit 25, and the fiber introducing unit 23 will be described below in this order.

The material generation unit 21 includes a material supply unit 30 and a plasticizing unit 35. The material supply unit 30 supplies the shaping material PM, which is a raw material for generating the plasticized material, to the plasticizing unit 35. In the present embodiment, the material supply unit 30 is configured as a so-called hopper, and includes a material accommodation unit 31 that accommodates the supplied shaping material PM, and a communication path 32 that is coupled to a discharge port below the material supply unit 30 and that guides the shaping material PM of the material supply unit 30 to the plasticizing unit 35.

The shaping material PM is supplied to the material supply unit 30 in a form of pellets. The shaping material PM contains the thermoplastic resin as a main component. Examples of the thermoplastic resin contained in the shaping material PM include, for example, polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), and the like. In addition to the above thermoplastic resin, a pigment, a metal, a ceramic, or the like may be mixed in the shaping material PM to be supplied to the material supply unit 30. The shaping material PM may not be supplied to the material supply unit 30 as pellets, and may be supplied in a state of a solid material such as powder.

As described above, the shaping material PM includes the first fiber material FBa in addition to the above thermoplastic resin. In the present embodiment, the first fiber material FBa is mixed into the pellets to be supplied to the material supply unit 30. The first fiber material FBa is formed of, for example, carbon fibers. The first fiber material FBa may be formed of a fiber material other than carbon fibers, and may be formed of, for example, glass fibers. The first fiber material FBa may be formed of various fibers having a higher elastic modulus than a resin material.

A fiber diameter of the first fiber material FBa may be, for example, from 5 μm to 20 μm. In the present disclosure, the "fiber diameter" of the fiber material corresponds to a dimension of a maximum width in a cross section orthogonal to a length direction of the fiber material. Therefore, for example, when a cross-sectional shape of the fiber material is substantially a circle, the fiber diameter corresponds to a maximum value of a diameter of the circle. When the cross-sectional shape of the fiber material is substantially a quadrangle, the fiber diameter corresponds to the larger one of side lengths of the quadrangle. When the cross-sectional shape of the fiber material is substantially an ellipse, the fiber diameter corresponds to a major axis of the ellipse. In the present embodiment, the first fiber material FBa is not formed of a fiber bundle, and the fiber diameter of the first fiber material FBa corresponds to a fiber diameter of a single fiber material. In another embodiment, when the first fiber member FBa is formed of a fiber bundle, the fiber diameter of the first fiber member FBa corresponds to a fiber diameter of the fiber bundle.

A length of the first fiber material FBa may be, for example, 5 mm or less. The length of the first fiber material FBa may be smaller than a maximum dimension of the pellets to be mixed. Thus, a larger number of the first fiber materials FBa can be mixed into the pellets. The length of the first fiber material FBa may be smaller than a hole diameter Dn of a nozzle opening 28 to be described later. This makes it possible to smoothly discharge the plasticized material containing the first fiber material FBa from the nozzle opening 28.

In another embodiment, the first fiber material FBa may not be mixed in the pellets. For example, the first fiber material FBa may be supplied to the material supply unit 30 separately from the pellets of the thermoplastic resin, and may be kneaded with the thermoplastic resin in the plasticizing unit 35 described below. According to this configuration, a content of the first fiber material FBa in the thermoplastic resin can be appropriately adjusted.

The plasticizing unit 35 plasticizes at least a part of the thermoplastic resin contained in the shaping material PM supplied from the material supply unit 30 to generate the plasticized material, and sends the plasticized material to the nozzle unit 25. The plasticizing unit 35 can also be referred to as a plasticizing apparatus 35. The plasticizing unit 35 includes a screw case 36, a drive motor 37, a flat screw 40, and a facing portion 50.

The flat screw 40 is a substantially cylindrical screw whose height in an axial direction along a rotation axis RX is smaller than a diameter. The rotation axis RX coincides with a central axis of the flat screw 40. In FIG. 1, the rotation axis RX of the flat screw 40 is shown by a dashed line. The flat screw 40 is disposed on the facing portion 50 such that the rotation axis RX is parallel to the Z direction, and rotates in a circumferential direction. A lower surface 41 of the flat screw 40 facing the facing portion 50 has a spiral groove portion 42 extending from a side surface toward the rotation axis RX. Hereinafter, the lower surface 41 of the flat screw 40 is also referred to as a "groove forming surface 41". The communication path 32 of the material supply unit 30 is coupled to the groove portion 42 at a side surface of the flat screw 40. A specific configuration of the flat screw 40 will be described later.

The flat screw 40 is housed in the screw case 36. An upper surface 43 of the flat screw 40 is coupled to the drive motor 37. The flat screw 40 is rotated in the screw case 36 by a rotational driving force generated by the driving motor 37. The drive motor 37 is driven under the control of the control unit 10.

The facing portion 50 is also referred to as a barrel, and is configured by a substantially cylindrical member whose height in a direction along a central axis is smaller than a diameter thereof. In the present embodiment, the facing portion 50 is disposed such that the central axis thereof coincides with the rotation axis RX of the flat screw 40.

The facing portion 50 has a facing surface 51 facing the groove forming surface 41 of the flat screw 40. A space is formed between the groove portion 42 of the groove forming surface 41 and the facing surface 51 of the facing portion 50. The shaping material PM supplied from the material supply unit 30 flows into this space from the side surface of the flat screw 40. The shaping material PM supplied to the space in the groove portion 42 is guided to a center of the flat screw 40 by rotation of the spiral groove portion 42 when the flat screw 40 rotates.

A heater 52 for heating the shaping material PM is embedded in the facing surface 51 of the facing portion 50. The heater 52 heats the flat screw 40 or the facing portion 50. In another embodiment, the heater 52 may be embedded in the flat screw 40, or may be disposed separately from the flat screw 40 or the facing portion 50. A communication hole 53, which penetrates the facing portion 50 along a central axis of the facing portion 50, is provided at a center of the facing surface 51. As will be described later, the communication hole 53 communicates with the nozzle opening 28 via an introduction flow path 26 and a nozzle flow path 27 of the nozzle unit 25. The communication hole 53 constitutes a flow path having a substantially circular cross section. While the thermoplastic resin contained in the shaping material is plasticized and converted into the plasticized material by the heating of the heater 52, the shaping material PM supplied to the groove portion 42 of the flat screw 40 is guided to the communication hole 53 opened at the center of the facing surface 51 along the groove portion 42 by rotation of the flat screw 40. A downstream end of the communication hole 53 is coupled to the nozzle unit 25. The plasticized material generated by the rotation of the flat screw 40 is supplied to the nozzle unit 25 through the communication hole 53.

The nozzle unit 25 includes the introduction flow path 26, the nozzle flow path 27, the nozzle opening 28, and a discharge amount control mechanism 80. The introduction flow path 26 is coupled to the downstream end of the communication hole 53 of the facing portion 50, and is formed linearly from the downstream end of the communication hole 53 along the Z direction. The introduction flow path 26 constitutes a flow path having a substantially circular cross section, and is formed such that a central axis of the introduction flow path coincides with the rotation axis RX of the flat screw 40. In the present embodiment, a diameter of the introduction flow path 26 is substantially equal to a diameter of the communication hole 53 of the facing portion 50.

The nozzle flow path 27 is coupled to a downstream end of the introduction flow path 26, and is formed linearly from the downstream end of the introduction flow path 26 along the Z direction. The nozzle flow path 27 constitutes a flow path having a substantially circular cross section, and is formed such that a central axis of the nozzle flow path coincides with the rotation axis RX of the flat screw 40. The nozzle flow path 27 has a reduced diameter at a downstream end portion thereof. In the present embodiment, the diameter of the nozzle flow path 27 is, except for the downstream end portion thereof, substantially equal to the diameter of the introduction flow path 26. The nozzle opening 28 is an opening having the hole diameter Dn that is formed at the downstream end portion of the nozzle flow path 27 and that opens in the Z direction. The hole diameter Dn of the nozzle opening 28 may be, for example, from 50 μm to 3 mm. In another embodiment, the hole diameter Dn may be smaller than 50 μm or larger than 3 mm. The plasticized material introduced from the material generation unit 21 to the nozzle unit 25 is discharged from the nozzle opening 28 via the introduction flow path 26 and the nozzle flow path 27.

The discharge amount control mechanism 80 is provided in the introduction flow path 26. The discharge amount control mechanism 80 controls a flow rate of the plasticized material in the introduction flow path 26 to control a discharge amount of the plasticized material from the nozzle opening 28. In the present embodiment, the discharge amount control mechanism 80 is configured by a butterfly valve that is a valve element that rotates in the introduction flow path 26 under the control of the control unit 10. An opening area of the introduction flow path 26 varies depending on a rotation angle of the butterfly valve. The control unit 10 controls the flow rate of the plasticized material in the introduction flow path 26 by controlling the rotation angle of the valve element. The discharge amount control mechanism 80 can close the introduction flow path 26 so as to stop a flow of the plasticized material in the introduction flow path 26. The discharge amount control mechanism 80 may not be provided in the introduction flow path 26, and may be provided in the nozzle flow path 27. In addition, the discharge amount control mechanism 80 may not be provided in the nozzle unit 25, and may be provided in the communication hole 53 of the facing portion 50, for example. The discharge amount control mechanism 80 may be omitted, or may be a configuration other than the butterfly valve.

The fiber introducing unit 23 has a function of introducing the second fiber material FBb, which is longer than the first fiber material FBa, into the plasticized material before being discharged from the nozzle opening 28 under the control of the control unit 10. In the present embodiment, the second fiber material FBb is a continuous linear member wound around a reel 62 to be described later, and is introduced into the shaped object with a length continuous up to a cutting position by a cutting unit 66 to be described later. The second fiber material FBb is introduced into the shaped object, for example, with a length of one pass to be described later.

The second fiber material FBb is configured by a fiber bundle in which a plurality of fibers are bundled. In the present embodiment, the second fiber material FBb has a configuration in which a plurality of carbon fibers are bundled by a sizing agent. In another embodiment, the second fiber material FBb may not be formed of carbon fibers, and may be formed of, for example, glass fibers. The second fiber material FBb may be formed of various fibers having a higher elastic modulus than the resin material. A fiber diameter of the second fiber material FBb may be, for example, from 10 μm to the hole diameter Dn of the nozzle opening 28. When the hole diameter Dn of the nozzle opening 28 is larger than 500 μm, the fiber diameter of the second fiber material FBb may be 500 μm or less. The fiber diameter of the second fiber material FBb corresponds to a dimension of a maximum width in a cross section orthogonal to a length direction of the fiber bundle that constitutes the second fiber material FBb.

The fiber introducing unit 23 includes a conveying unit 60 that conveys the second fiber material FBb in order to introduce the second fiber material FBb. The conveying unit 60 includes an accommodation unit 63 that accommodates the second fiber material FBb wound around the reel 62, a conveying path 65 that sends out the second fiber material FBb from the accommodation unit 63, and a cutting unit 66 that cuts the second fiber material FBb.

The accommodation unit 63 is provided with a conveying motor, which is not shown, that generates a conveying force for rotating the reel 62 to send out the second fiber material FBb through the conveying path 65. A rotation speed of the conveying motor is controlled by the control unit 10. The conveying path 65 is a cylindrical tubular member through which the second fiber material FBb is inserted. In the present embodiment, the conveying path 65 is coupled to the introduction flow path 26 so that the second fiber material FBb can be introduced into the plasticized material that passes through the introduction flow path 26. The conveying path 65 is coupled to the introduction flow path 26 on downstream of the discharge amount control mechanism 80.

The fiber introducing unit 23 sends the second fiber material FBb to the introduction flow path 26 through the conveying path 65. The sent second fiber material FBb is introduced into the plasticized material that flows through the introduction flow path 26, and is discharged from the nozzle opening 28 together with the plasticized material. Shaping of the shaped object by discharging the plasticized material will be described later.

The cutting unit 66 is disposed near an entrance of the conveying path 65 in the accommodation unit 63, and cuts the second fiber material FBb sent to the conveying path 65 under the control of the control unit 10. The cutting unit 66 may be configured by, for example, a mechanism in which a cutter blade protrudes by a solenoid mechanism to cut the second fiber material FBb. In another embodiment, the cutting unit 66 may be a configuration of cutting the second fiber material FBb by emitting a laser. The control unit 10 can adjust a length of the second fiber material FBb included in the shaped object by controlling a timing of cutting the second fiber material FBb by the cutting unit 66. In the present embodiment, the second fiber material FBb is introduced into the shaped object with a length of at least 10 mm or more.

The shaping stage unit 70 is disposed at a position at which the shaping stage unit 70 faces the nozzle opening 28 of the discharging unit 20. The shaping stage unit 70 includes a stage 72 that supports the shaped object, a shaping table 73 that is placed on the stage 72, and a moving mechanism 75 that is configured to move the stage 72 in the X, Y, and Z directions. The stage 72 is formed of a plate-shaped member and has a stage surface 72s arranged along a horizontal direction. The shaping table 73 is formed of a plate-shaped member, is placed on the stage surface 72s, and receives the plasticized material discharged from the nozzle opening 28. The moving mechanism 75 is configured as a three-axis positioner that moves the stage 72 in three axial directions of the X, Y, and Z directions, and includes three motors M that generate driving forces under the control of the control unit 10. In the shaping processing, the control unit 10 controls the moving mechanism 75 to relatively move the nozzle unit 25 and the stage 72.

In another embodiment, instead of the configuration in which the stage 72 is moved by the moving mechanism 75, a configuration may be adopted in which the moving mechanism 75 moves, in a state in which a position of the stage 72 is fixed, the nozzle unit 25 with respect to the stage 72. Even with such a configuration, the stage 72 and the nozzle unit 25 can be relatively moved. In another embodiment, a configuration may be adopted in which the moving mechanism 75 moves each of the stage 72 and the nozzle unit 25 to change a relative position between the stage 72 and the nozzle unit 25.

Figure 2:
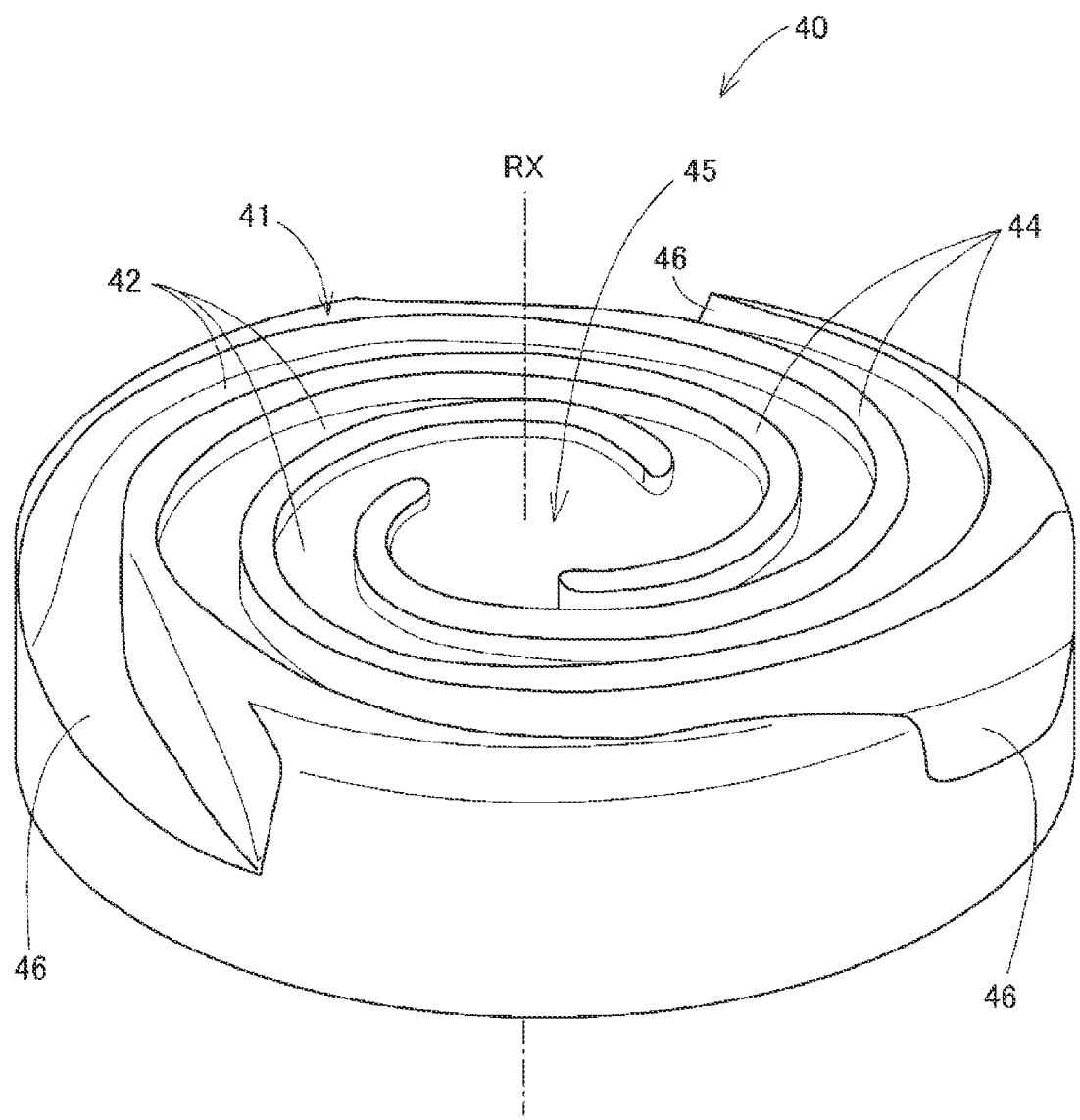
FIG. 2 is a schematic perspective view showing a configuration of a flat screw.

FIG. 2 is a schematic perspective view showing the configuration of the flat screw 40 when viewed from the groove forming surface 41 side. In FIG. 2, the rotation axis RX of the flat screw 40 is shown by a dashed line. In the present embodiment, the flat screw 40 has a configuration in which three groove portions 42 extend in parallel in a spiral arc toward a central portion 45 of the flat screw 40. The groove portions 42 are respectively defined by three ridge portions 44 extending spirally toward a recessed portion of the central portion 45.

The number of the groove portions 42 of the flat screw 40 may not be three. The flat screw 40 may have only one groove portion 42, or may have two or more groove portions 42. In addition, any number of the ridge portions 44 may be provided in accordance with the number of the groove portions 42. Further, the groove portion 42 may extend in a spiral arc, and may not necessarily extend spirally.

One end of the groove portion 42 is opened at the side surface of the flat screw 40, and constitutes a material inlet 46 that receives the shaping material PM supplied from the communication path 32. The groove portion 42 continues to the central portion 45 of the flat screw 40, and the other end of the groove portion 42 is coupled to the central portion 45 of the flat screw 40. The central portion 45 of the flat screw 40 constitutes a recessed portion in which the plasticized material gathers. The plasticized material is formed by plasticizing the thermoplastic resin of the shaping material PM.

Figure 3:
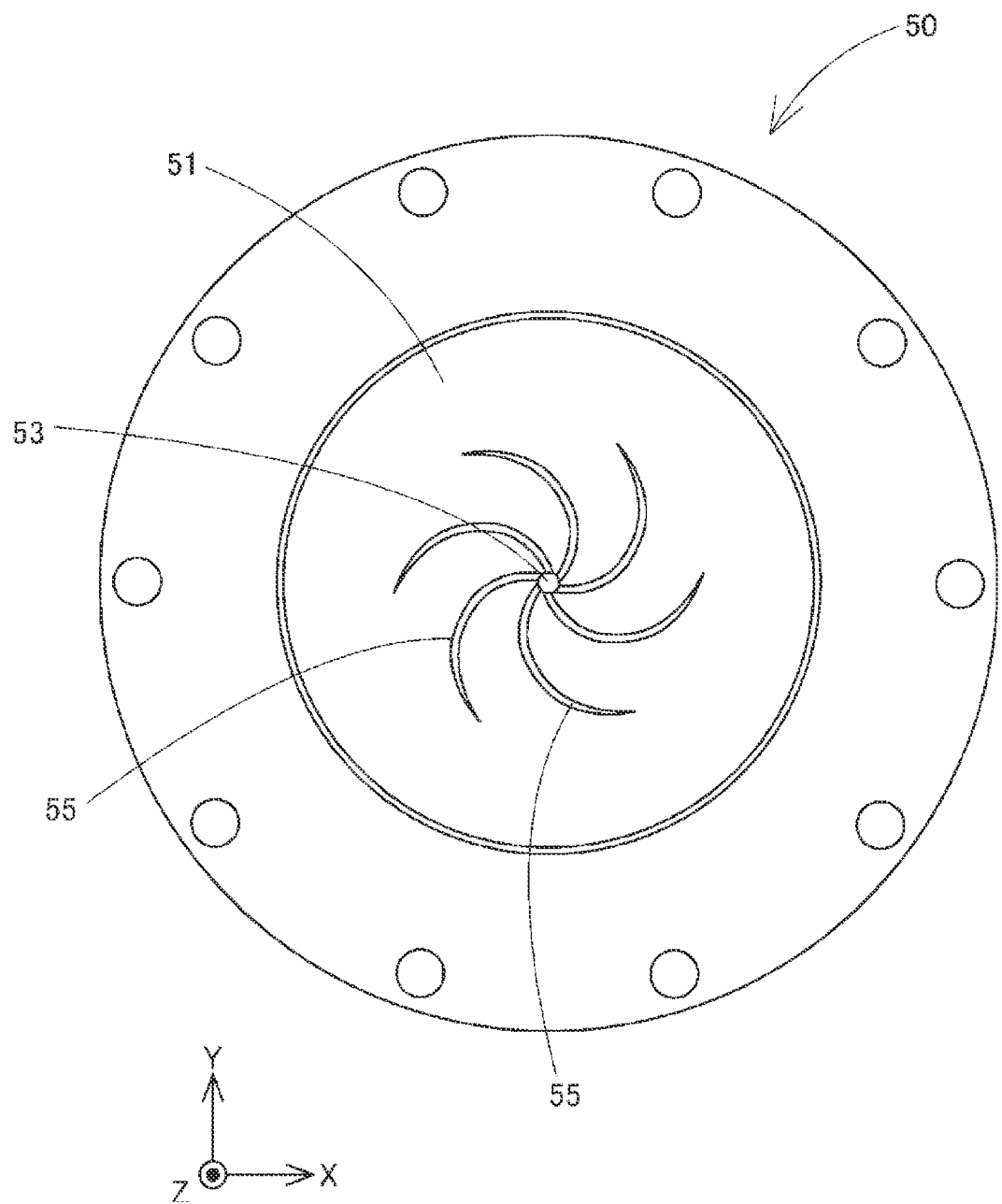
FIG. 3 is a schematic plan view showing a configuration of a facing surface of a facing portion.

FIG. 3 is a schematic plan view showing a configuration of the facing surface 51 of the facing portion 50. As described above, the facing surface 51 faces the groove forming surface 41 of the flat screw 40. At the center of the facing surface 51, the above-described communication hole 53, which is used for supplying the plasticized material flowing into the central portion 45 of the flat screw 40 to the nozzle unit 25, is opened. The facing surface 51 has a plurality of guide grooves 55 that have one end coupled to the communication hole 53 and that extend spirally from the communication hole 53 toward an outer periphery. The guide groove 55 has a function of guiding the plasticized material to the communication hole 53.

The heater 52 shown in FIG. 1 is embedded in the facing portion 50. The plasticization of the thermoplastic resin in the plasticizing unit 35 is achieved by the heating of the heater 52 in the facing portion 50 and the rotation of the flat screw 40. According to the shaping apparatus 100a according to the first embodiment, a size of an apparatus configuration for plasticizing the thermoplastic resin can be reduced with the flat screw 40. In addition, according to the shaping apparatus 100a according to the first embodiment, control of a pressure or the flow rate of the plasticized material to be supplied to the nozzle unit 25 can be facilitated by rotation control of the flat screw 40. Therefore, accuracy of discharging the plasticized material from the nozzle unit 25 can be increased, and accuracy of shaping the shaped object can be increased.

Figure 4:
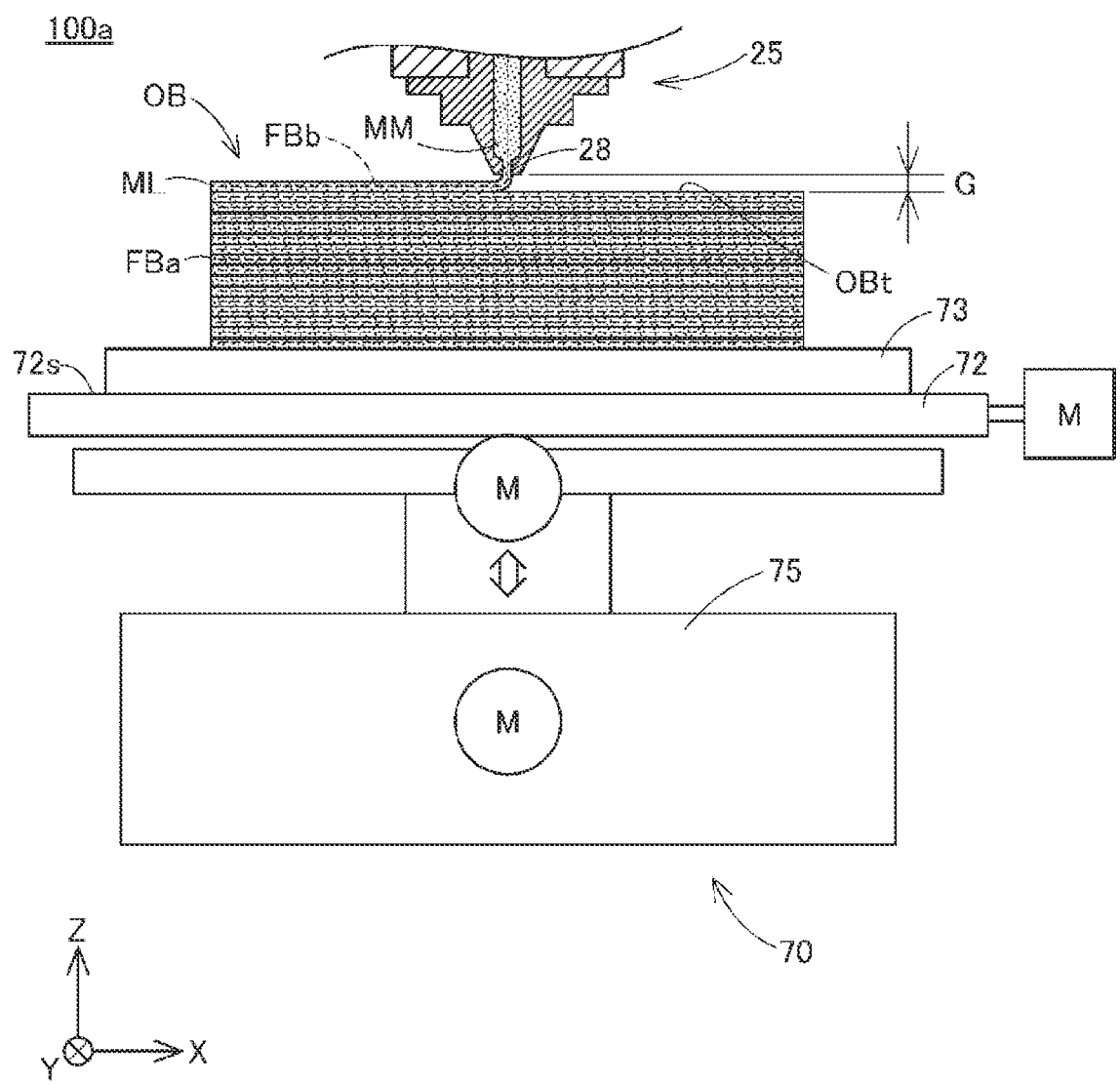
FIG. 4 is a schematic diagram schematically showing how a three-dimensional shaped object is shaped.

FIG. 4 is a schematic diagram schematically showing how a shaping layer ML formed by discharging a plasticized material MM from the nozzle opening 28 is laminated to shape a shaped object OB in the shaping apparatus 100a. In FIG. 4, for convenience, the first fiber material FBa is indicated by only a reference numeral indicating that the first fiber material FBa is included in the plasticized material MM or the shaping layer ML, and the second fiber material FBb is indicated by a broken line.

In the shaping processing of the shaping apparatus 100a, the plasticized material MM is discharged from the nozzle opening 28 while the nozzle unit 25 and the stage 72 are relatively moved in the horizontal direction. Thus, the plasticized material MM is linearly deposited on the stage 72 so as to draw a movement trajectory of the nozzle opening 28, and the shaping layer ML including the first fiber material FBa and the second fiber material FBb is formed. The shaped object OB is formed by further discharging the plasticized material MM onto the shaping layer ML and laminating the shaping layer ML.

In the shaping apparatus 100a, a gap G is maintained between the nozzle opening 28 and an upper surface OBt of the shaped object OB being shaped. Here, "the upper surface OBt of the shaped object OB" refers to a planned place where the plasticized material MM discharged from the nozzle opening 28 is to be deposited near a position directly below the nozzle opening 28. The gap G is adjusted by the moving mechanism 75 changing a relative position between the stage 72 and the nozzle opening 28 in the Z direction.

A size of the gap G is preferably equal to or smaller than the hole diameter Dn of the nozzle opening 28 shown in FIG. 1, and more preferably equal to or smaller than 0.8 times the hole diameter Dn. Thus, the plasticized material MM discharged from the nozzle opening 28 can be deposited on the upper surface OBt of the shaped object OB, while sufficiently securing a contact surface with the upper surface OBt of the shaped object OB being shaped. As a result, generation of a gap in a cross section of the shaping layer ML and deformation of a shape of the upper surface OBt of the shaped object OB can be prevented, strength of the shaped object OB can be secured, and a surface roughness of the shaped object OB can be reduced. In a configuration in which the heater is provided around the nozzle opening 28, by forming the gap G, a decrease in a temperature of the upper surface OBt of the shaped object OB can be appropriately controlled by the heater, and a decrease in adhesion between the laminated shaping layers ML can be prevented. Therefore, interlayer strength of the shaped object OB can be secured. Further, by forming the gap G, discoloration or deterioration due to overheating of the deposited plasticized material MM by the heater can be prevented.

The size of the gap G is preferably 0.5 times or less the hole diameter Dn, and particularly preferably 0.3 times or less the hole diameter Dn. Accordingly, the plasticized material MM can be accurately deposited at the planned place. A decrease in adhesion between the plasticized material MM and the upper surface OBt, when the plasticized material MM is discharged to the upper surface OBt of the shaped object OB, can be prevented, and a decrease in the adhesion between the laminated shaping layers ML can be prevented.

In the present embodiment, the plasticized material MM solidifies due to a decrease in a temperature after being discharged from the nozzle opening 28. In another embodiment, the plasticized material MM may be a material that is cured by a sintering step of sintering the shaped object OB in a sintering furnace after the shaping of the shaped object OB is completed. Further, the plasticized material MM may be a material that is photocured by irradiation with an ultraviolet laser after being discharged from the nozzle opening 28. In this case, the shaping apparatus 100*a* may include a laser irradiation device for curing the plasticized material MM.

Figure 5:
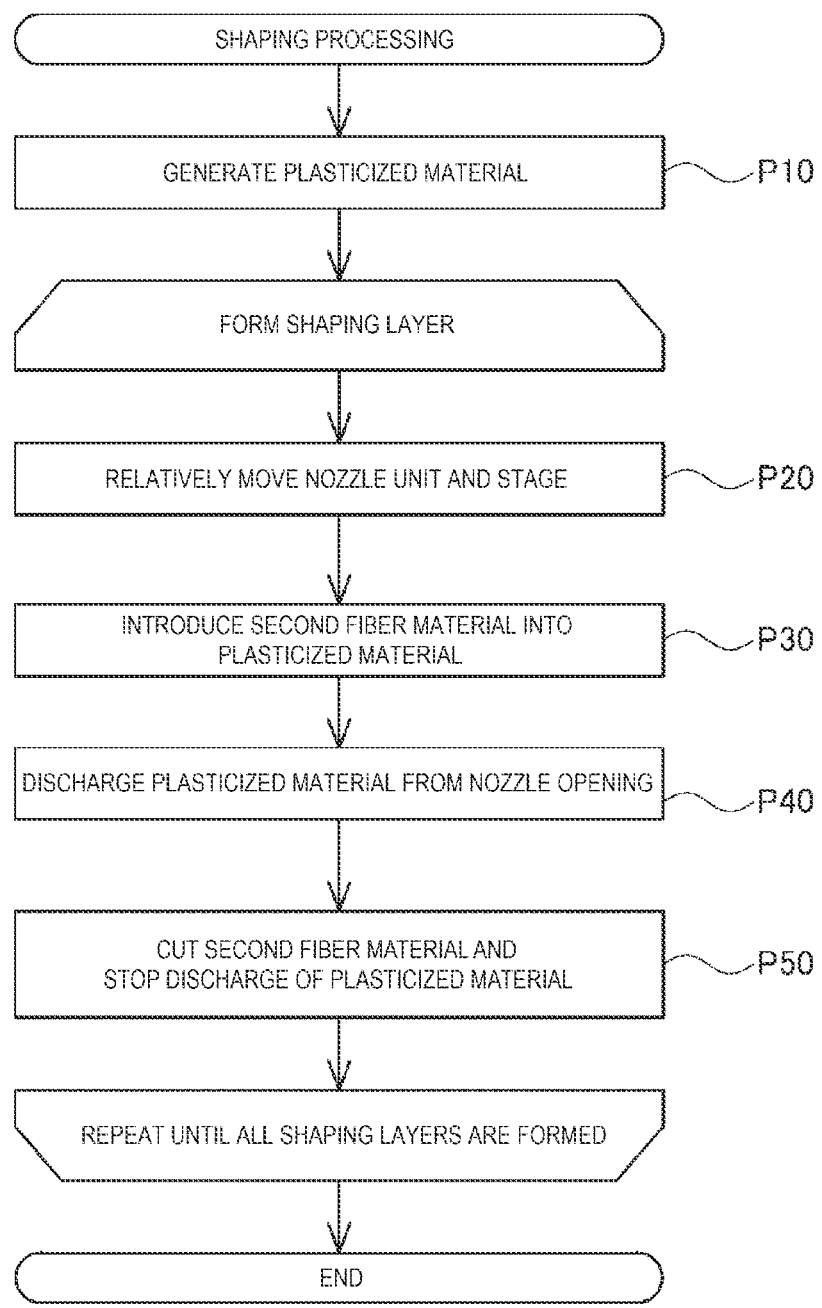
FIG. 5 is a flowchart showing steps executed in shaping processing according to the first embodiment.

FIG. 5 is a flowchart showing steps executed in the shaping processing of the shaping apparatus 100*a*. This shaping processing is executed based on shaping data for forming the shaping layer ML that constitutes the shaped object OB. The shaping data is generated based on three-dimensional shape data that represent a shape of the shaped object OB, such as three-dimensional CAD data. The shaping data includes, for example, information on a position of the shaping layer ML in the shaped object OB, information on a dimension of the shaping layer ML, information on a movement path of the nozzle opening 28, information on the discharge amount of the plasticized material, and the like.

Step P10 is a step executed by the plasticizing unit 35 of the material generation unit 21 under the control of the control unit 10. Step P10 corresponds to a plasticizing step of plasticizing at least a part of the shaping material PM including the first fiber material FBa and the thermoplastic resin to generate the plasticized material. In the present embodiment, as described above, the thermoplastic resin is plasticized using the flat screw 40. Step P10 includes a step of introducing the shaping material PM of the material supply unit 30 into the groove portion 42 of the flat screw 40 while rotating the flat screw 40 in a state in which the flat screw 40 faces the facing portion 50, and guiding at least a part of the thermoplastic resin included in the shaping material PM to the communication hole 53 of the facing portion 50 while plasticizing the thermoplastic resin in the groove portion 42. That is, step P10 includes a step of guiding at least a part of the thermoplastic resin that is supplied between the flat screw 40 and the facing portion 50 to the communication hole 53 while plasticizing the thermoplastic resin by the rotation of the flat screw 40 and the heating of the heater 52. As described above, since the flat screw 40 is used in the plasticizing step, a size of the plasticizing unit 35 is reduced. Further, since the control of the pressure and the flow rate of the plasticized material supplied to the nozzle unit 25 is facilitated by the rotation control of the flat screw 40, the accuracy of discharging the plasticized material MM from the nozzle unit 25 can be increased, and the accuracy of shaping the shaped object can be increased. The plasticizing unit 35 continues the plasticizing step in step P10 at least while executing the following steps P20 to P50.

Steps P20 to P50 correspond to an operation of one pass in the shaping apparatus 100*a*. The "pass" refers to a processing unit in which the nozzle opening 28 is scanned while continuously discharging the plasticized material from the nozzle opening 28 without interruption, and one continuous shaping part is formed on the stage 72. One shaping layer ML is formed by executing a series of operations of steps P20 to P50 once or more. In the shaping processing according to the present embodiment, all the shaping layers ML to be laminated are formed, and steps P20 to P50 are repeated until the shaping of the shaped object is completed.

Steps P20 to P40 are steps in which a series of operations of the shaping apparatus 100*a* are performed when the shaping layer ML is formed by discharging the plasticized material from the nozzle opening 28 while relatively moving the nozzle unit 25 and the stage 72. The shaping apparatus 100*a* executes step P40 while executing step P20 and step P30.

Step P20 is a step that is executed by the moving mechanism 75 under the control of the control unit 10, and corresponds to a moving step of relatively moving the stage 72 and the nozzle unit 25. Under the control of the control unit 10, the moving mechanism 75 relatively moves the stage 72 and the nozzle opening 28 at a relative movement speed determined in advance based on the shaping data.

Step P30 is a step executed by the fiber introducing unit 23 of the discharging unit 20 under the control of the control unit 10. Step P30 corresponds to a fiber introducing step of introducing the second fiber material FBb into the plasticized material before being discharged from the nozzle opening 28.

Step P40 is a step in which the discharging unit 20 discharges the plasticized material from the nozzle opening 28 under the control of the control unit 10. The discharging unit 20 discharges the plasticized material from the nozzle opening 28 in a discharge amount per unit time determined in advance based on the shaping data. The control unit 10 controls the discharge amount of the plasticized material per unit time by controlling the number of rotations of the flat screw 40 and an opening degree of the discharge amount control mechanism 80.

In step P50, the control unit 10 stops discharging the plasticized material from the nozzle opening 28 at the timing when forming of one shaping layer ML is completed. First, the control unit 10 stops introducing the second fiber material FBb from the fiber introducing unit 23, and controls the cutting unit 66 to cut the second fiber material FBb. Thereafter, the control unit 10 controls the discharge amount control mechanism 80 to stop supplying the plasticized material to the nozzle unit 25. Thus, the formation of the shaping layer ML for one pass is completed. Step P50 includes a cutting step of cutting the second fiber material FBb. Accordingly, the adjustment of the length of the second fiber material FBb, control of stopping the introduction of the second fiber material FBb, and the like can be easily performed.

As described above, one shaping layer ML is formed by performing a series of operations of steps P20 to P50 once or more, and steps P20 to P50 are repeated until all shaping layers ML are formed. Steps P10 to P50 correspond to a shaping step of shaping the shaped object OB in which the shaping layers ML including the first fiber material FBa and the second fiber material FBb are laminated.

Figure 6:
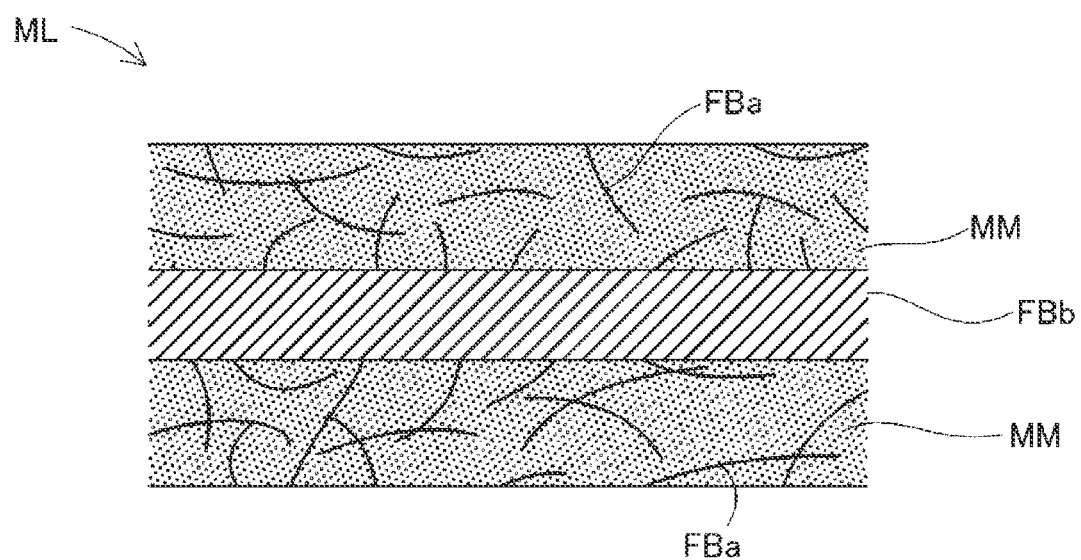
FIG. 6 is a schematic cross-sectional view of a shaping layer formed by the shaping processing according to the first embodiment.

FIG. 6 is a schematic cross-sectional view schematically showing a cross section along a laminating direction in an example of the shaping layer ML to be formed by the shaping processing according to the present embodiment. The shaping layer ML is formed of the plasticized material MM into which the first fiber material FBa and the second fiber material FBb are introduced. One linear continuous second fiber material FBb is introduced into a central portion of the shaping layer ML. In the shaped object formed by the shaping processing according to the present embodiment, since each shaping layer ML includes the second fiber material FBb, strength of the entire shaped object is enhanced. Each of the shaping layers ML constituting the shaped object has enhanced strength in a length direction of the second fiber material FBb due to the second fiber material FBb. In each of the shaping layers ML, the first fiber material FBa exists around the second fiber material FBb while facing various directions and being entangled in some places. Accordingly, the strength of each shaping layer ML in various directions is enhanced. As described above, in each shaping layer ML, the two types of fiber materials FBa and FBb having different lengths are combined and mixed in the plasticized material so as to reinforce each other's strength in various directions. As a result, the strength of the entire shaped object in various directions is enhanced.

As described above, in the manufacturing method executed by the shaping apparatus 100a according to the first embodiment, the shaping step of shaping the three-dimensional shaped object by discharging the plasticized material from the nozzle opening 28 includes the fiber introducing step of introducing the second fiber material FBb into the plasticized material so that the plasticized material after being discharged from the nozzle opening 28 includes the second fiber material FBb longer than the first fiber material FBa. According to this manufacturing method, the first fiber material FBa and the second fiber material FBb having different lengths can be combined and mixed in the three-dimensional shaped object so as to reinforce each other's strength in various directions. Therefore, the strength of the three-dimensional shaped object in various directions can be easily improved.

2 Second Embodiment

Figure 7:
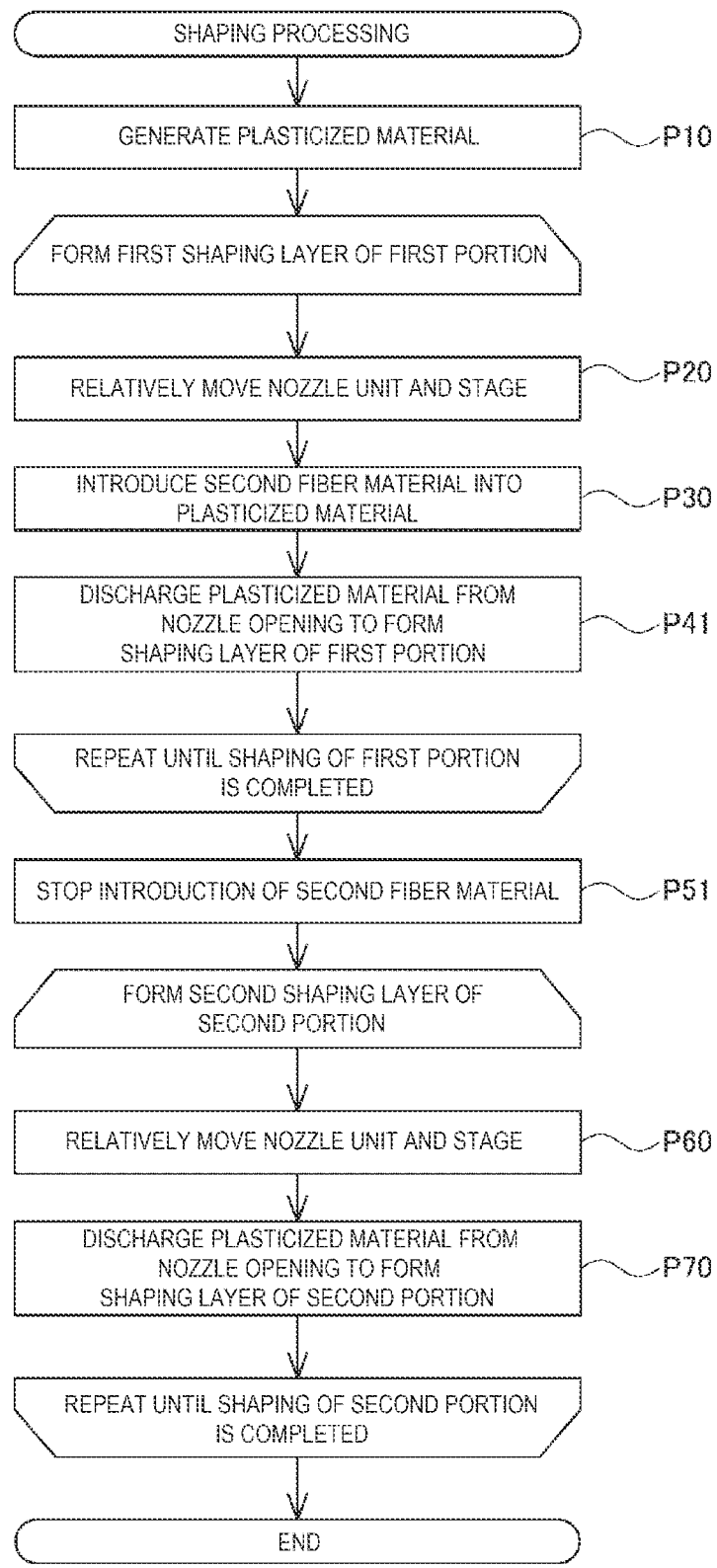
FIG. 7 is a flowchart showing steps executed in shaping processing according to a second embodiment.
Figure 8:
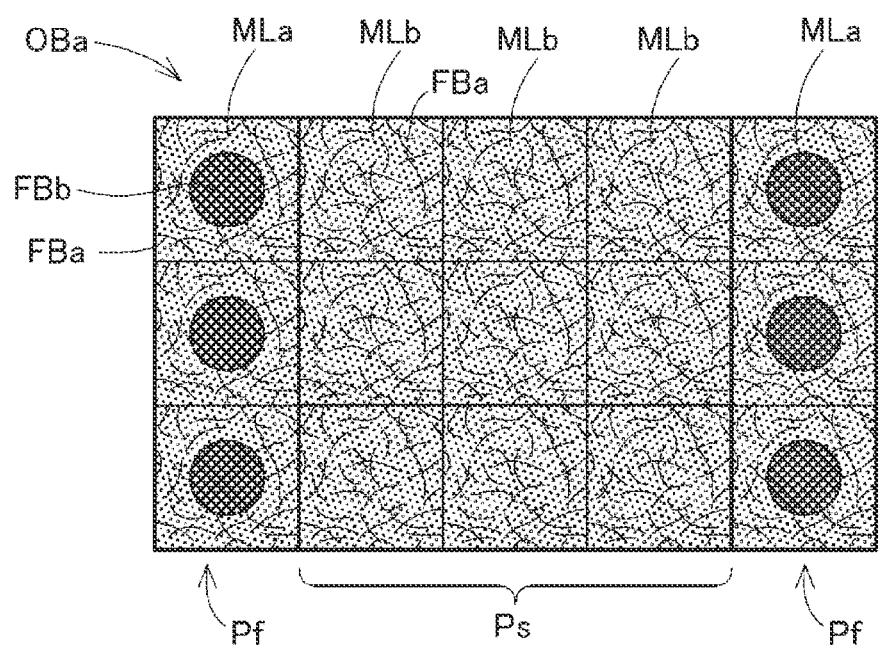
FIG. 8 is a schematic cross-sectional view of a three-dimensional shaped object formed by the shaping processing according to the second embodiment.

FIG. 7 is a flowchart showing steps executed in shaping processing according to a second embodiment. FIG. 8 is a schematic cross-sectional view schematically showing a cross section along a laminating direction of an example of a shaped object OBa formed by the shaping processing according to the second embodiment. The shaping processing according to the second embodiment is executed by the shaping apparatus 100a shown in FIG. 1 described in the first embodiment.

In the shaping processing according to the second embodiment, the shaped object OBa having first portions Pf that are parts of the shaped object OBa and that include the first fiber material FBa and the second fiber material FBb, and a second portion Ps that is a part of the shaped object OBa and that includes the first fiber material FBa and does not include the second fiber material FBb is shaped. In the second embodiment, the first portion Pf is a portion constituting an outline of the shaped object OBa, and the second portion Ps is a portion constituting an internal structure of the shaped object OBa that is surrounded by the outline.

Step P10 corresponds to a plasticizing step according to the second embodiment, and is executed in the same manner as described in the first embodiment. Step P10 is continued to be executed at least during the following steps P20 to P70.

Steps P20 to P51 are steps for one pass when forming a first shaping layer MLa included in each first portion Pf, and are repeated until formation of all the shaping layers MLa included in the first portion Pf is completed. Steps P20 to P51 correspond to a first shaping step of forming the first portion Pf including the first fiber material FBa and the second fiber material FBb. Steps P20 to P51 are the same as steps P20 to P40 described in the first embodiment except that steps P20 to P51 include step P41 instead of step P40. Step P41 is executed in the same manner as step P40 described in the first embodiment except that the first shaping layer MLa constituting the first portion Pf is formed. Step P20 corresponds to a moving step, and step P30 corresponds to the fiber introducing step.

When the formation of the first portion Pf is completed, in step P51, the introduction of the second fiber material FBb by the fiber introducing unit 23 is stopped in order to form the second portion Ps.

Steps P60 to P70 are steps for one pass when forming second shaping layers MLb included in the second portion Ps, and are repeated until the formation of all the shaping layers MLb included in the second portion Ps is completed. Step P60 corresponds to a moving step of relatively moving the stage 72 and the nozzle opening 28, and is executed in the same manner as step P20. In step P70, the nozzle unit 25 discharges the plasticized material that contains the first fiber material FBa and that does not contain the second fiber material FBb from the nozzle opening 28 under the control of the control unit 10. Thus, the second shaping layer MLb included in the second portion Ps is formed. Steps P60 to P70 correspond to a second shaping step of forming the second portion Ps that includes the first fiber material FBa and that does not include the second fiber material FBb.

As described above, the shaping processing according to the second embodiment includes, as a shaping step, a first shaping step of forming the first portions Pf and a second shaping step of forming the second portion Ps. According to the shaping processing according to the second embodiment, the first portion Pf that includes both the first fiber material FBa and the second fiber material FBb and the second portion Ps that does not include the second fiber material FBb can be selectively formed. That is, for example, a portion requiring strength can be selected to be formed as the first portion Pf that includes both of the two types of fiber materials FBa and FBb, and a portion not requiring strength can be selected to be formed as the second portion Ps that does not include the second fiber material FBb. Accordingly, a degree of freedom for shaping by the shaping apparatus 100a can be increased. Manufacturing costs can be reduced by saving a using amount of the second fiber material FBb.

In the shaping processing according to the second embodiment, as described above, the first portion Pf constitutes the outline of the shaped object OBa, and the second portion Ps constitutes the internal structure of the shaped object OBa. According to this configuration, strength of the outline of the shaped object OBa can be enhanced, and the introduction of the second fiber material FBb into the internal structure can be omitted, so that manufacturing costs of the shaped object OBa can be reduced. In the shaping processing according to the second embodiment, a volume of the second shaping layers MLb in the second portion Ps may be larger than a volume of the first shaping layers MLa in the first portions Pf. As a result, a time required for shaping the internal structure can be shortened, and productivity of the shaped object OBa can be further increased.

3 Third Embodiment

Figure 9:
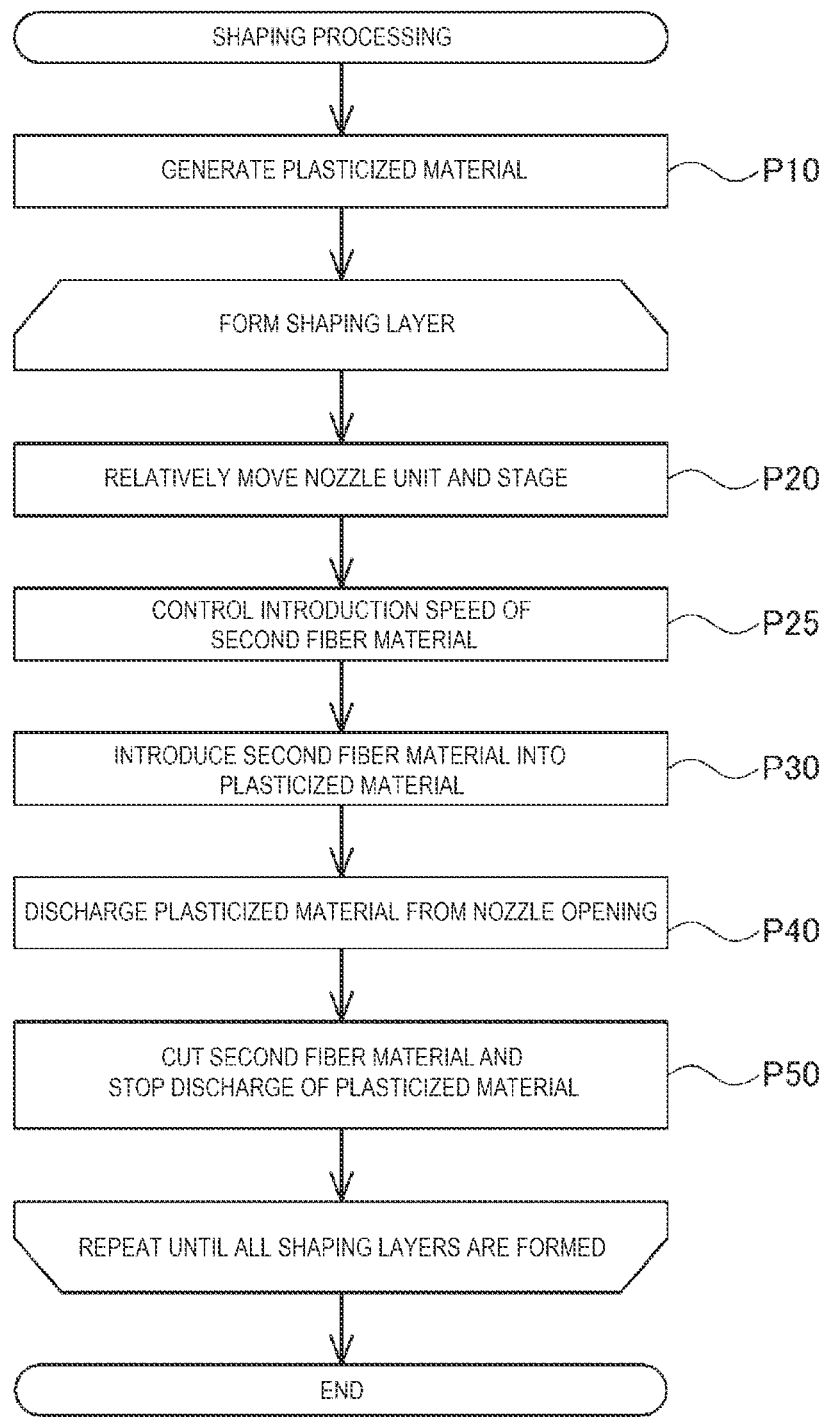
FIG. 9 is a flowchart showing steps executed in shaping processing according to a third embodiment.

FIG. 9 is a flowchart showing steps executed in shaping processing according to a third embodiment. The flowchart in FIG. 9 is substantially the same as the flowchart in FIG. 5 described in the first embodiment except that step P25 is added. The shaping processing according to the third embodiment is executed by the shaping apparatus 100a shown in FIG. 1 described in the first embodiment.

Step P25 is executed when introducing the second fiber material FBb into the plasticized material in the fiber introducing step of step P30. Step P25 corresponds to an introduction speed control step in which the control unit 10 controls an introduction speed at which the second fiber material FBb is introduced into the plasticized material in accordance with a relative movement speed between the nozzle unit 25 and the stage 72 in step P20. The "introduction speed" corresponds to the length of the second fiber material FBb sent from the conveying path 65 to the flow path of the plasticized material per unit time. In the third embodiment, the control unit 10 sets a target value of the introduction speed of the second fiber material FBb to be larger as the relative movement speed between the nozzle unit 25 and the stage 72 is larger, and controls a rotation speed of the reel 62 around which the second fiber material FBb is wound in accordance with the target value of the introduction speed.

Thus, since the introduction speed of the second fiber material FBb is controlled according to the relative movement speed between the nozzle unit 25 and the stage 72, it is possible to prevent an amount or a state of the second fiber material FBb to be introduced into the shaping layer ML from being changed due to a change in the relative movement speed between the nozzle opening 25 and the stage 72. Since the introduction speed of the second fiber material FBb is controlled to be larger as the relative movement speed between the nozzle unit 25 and the stage 72 is larger, the introduction of the second fiber material FBb into the plasticized material can be prevented from failing to catch up with a forming speed of the shaping layer ML.

4 Fourth Embodiment

Figure 10:
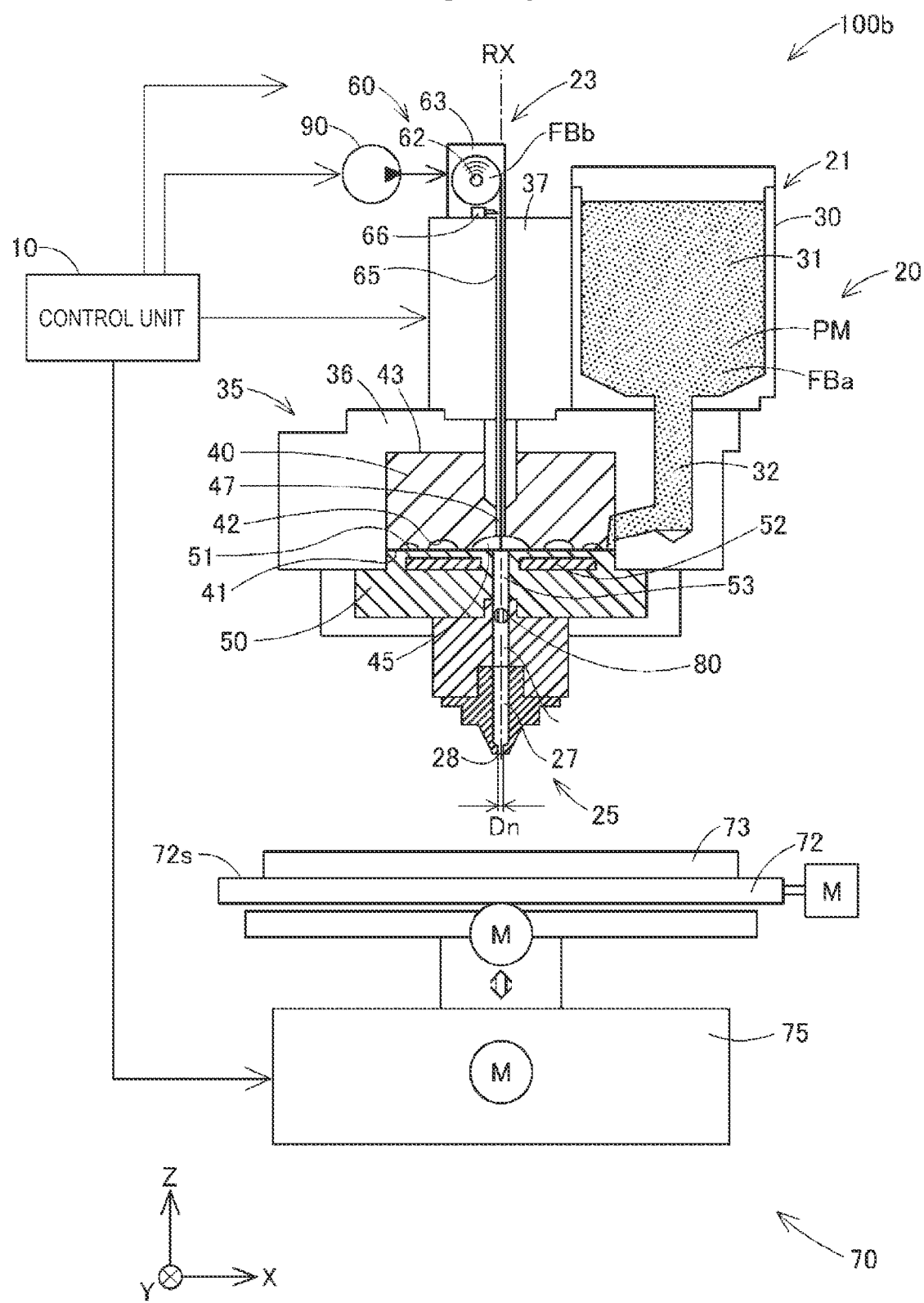
FIG. 10 is a schematic diagram showing a configuration of a three-dimensional shaping apparatus according to a fourth embodiment.

FIG. 10 is a schematic diagram showing a configuration of a shaping apparatus 100b according to a fourth embodiment. The shaping apparatus 100b according to the fourth embodiment has substantially the same configuration as the shaping apparatus 100a according to the first embodiment shown in FIG. 1 except for the following matters. In the shaping apparatus 100b according to the fourth embodiment, the flat screw 40 has a through hole 47. The fiber introducing unit 23 is provided above the plasticizing unit 35, and a pressure control unit 90 is added.

In the fourth embodiment, the flat screw 40 has the through hole 47 that penetrates from the upper surface 43 to the central portion 45 of the groove forming surface 41 at a position through which the rotation axis RX passes. The through hole 47 is opened at the groove forming surface 41 and communicates with the communication hole 53 of the facing portion 50. The accommodation unit 63 included in the conveying unit 60 of the fiber introducing unit 23 is disposed on the drive motor 37 of the flat screw 40. The conveying path 65 passes through a drive shaft of the drive motor 37 and is coupled to the through hole 47 of the flat screw 40. Thus, in the fiber introducing step, the second fiber material FBb is introduced into the plasticized material through the through hole 47 of the flat screw 40.

The pressure control unit 90 is configured by a pump. The pressure control unit 90 is coupled to the accommodation unit 63 of the conveying unit 60, and controls the pressure in the through hole 47 of the flat screw 40 through the accommodation unit 63 and the conveying path 65 under the control of the control unit 10.

Figure 11:
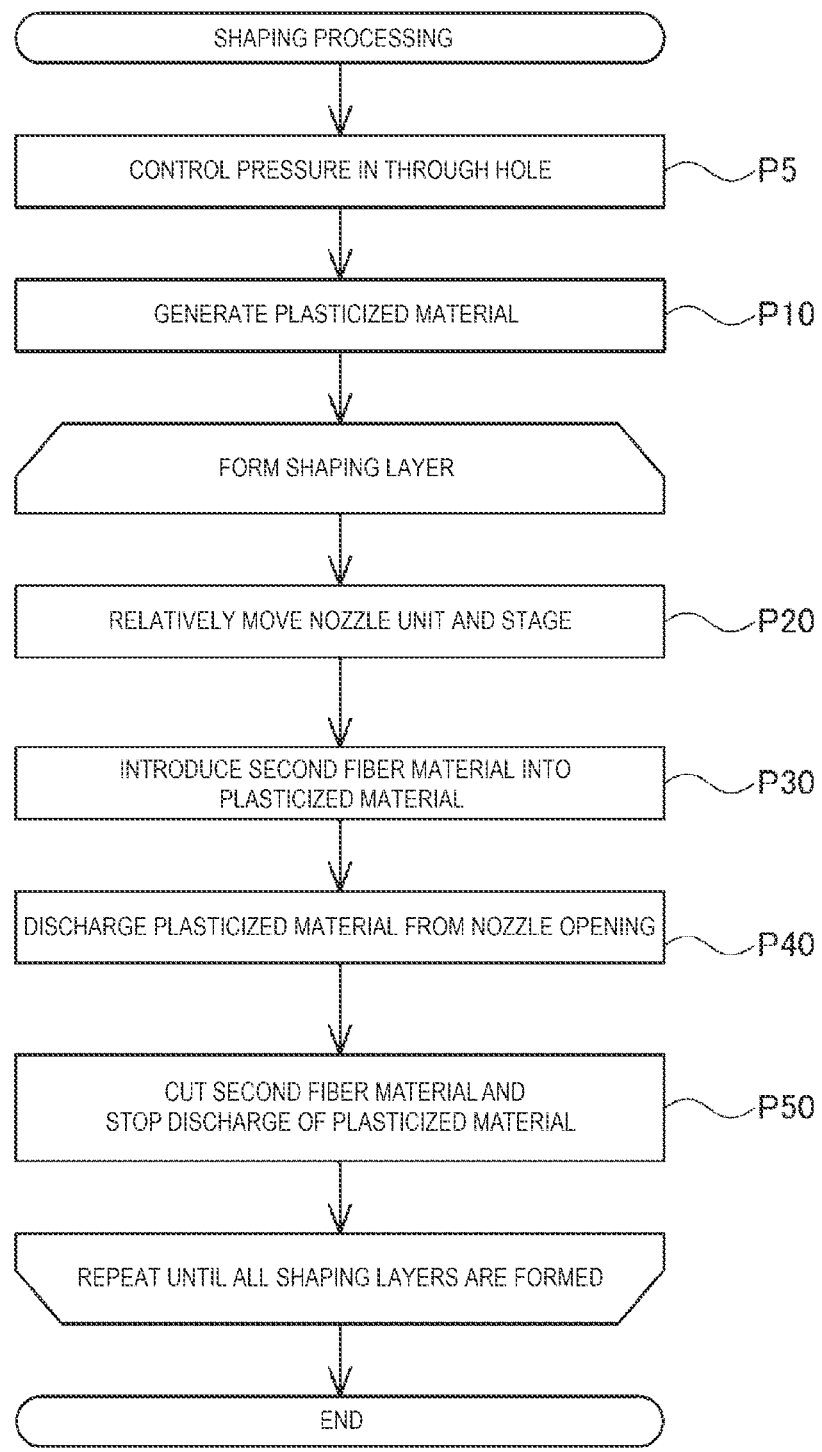
FIG. 11 is a flowchart showing steps executed in shaping processing according to the fourth embodiment.

FIG. 11 is a flowchart showing steps executed by a shaping apparatus 100c in shaping processing according to the fourth embodiment. The flowchart in FIG. 11 is substantially the same as the flowchart in FIG. 5 described in the first embodiment except that step P5 is added. Step P5 corresponds to a pressure control step in which the control unit 10 controls the pressure control unit 90 to control the pressure in the through hole 47 of the flat screw 40 to be higher than a pressure in the communication hole 53 of the facing portion 50. The pressure in the communication hole 53 is controlled by the control unit 10 controlling the number of rotations of the flat screw 40. Step P5 is started before the generation of the plasticized material in step P10 is started, and is continued during the generation of the plasticized material in the plasticizing unit 35. In the fourth embodiment, the second fiber material FBb is a plasticized material that is collected in the central portion 45 of the flat screw 40 after being plasticized in step P40 through the plasticizing step in step P10, and is introduced into the plasticized material before being discharged from the nozzle opening 28 in step P40.

According to the shaping apparatus 100c according to the fourth embodiment, the second fiber material FBb can be smoothly introduced into the communication hole 53 of the facing portion 50 through the through hole 47 of the flat screw 40. Since the pressure in the through hole 47 of the flat screw 40 is controlled to be higher than the pressure in the communication hole 53 of the facing portion 50 by the pressure control unit 90, the plasticized material of the central portion 45 can be prevented from flowing into the through hole 47.

5 Fifth Embodiment

Figure 12:
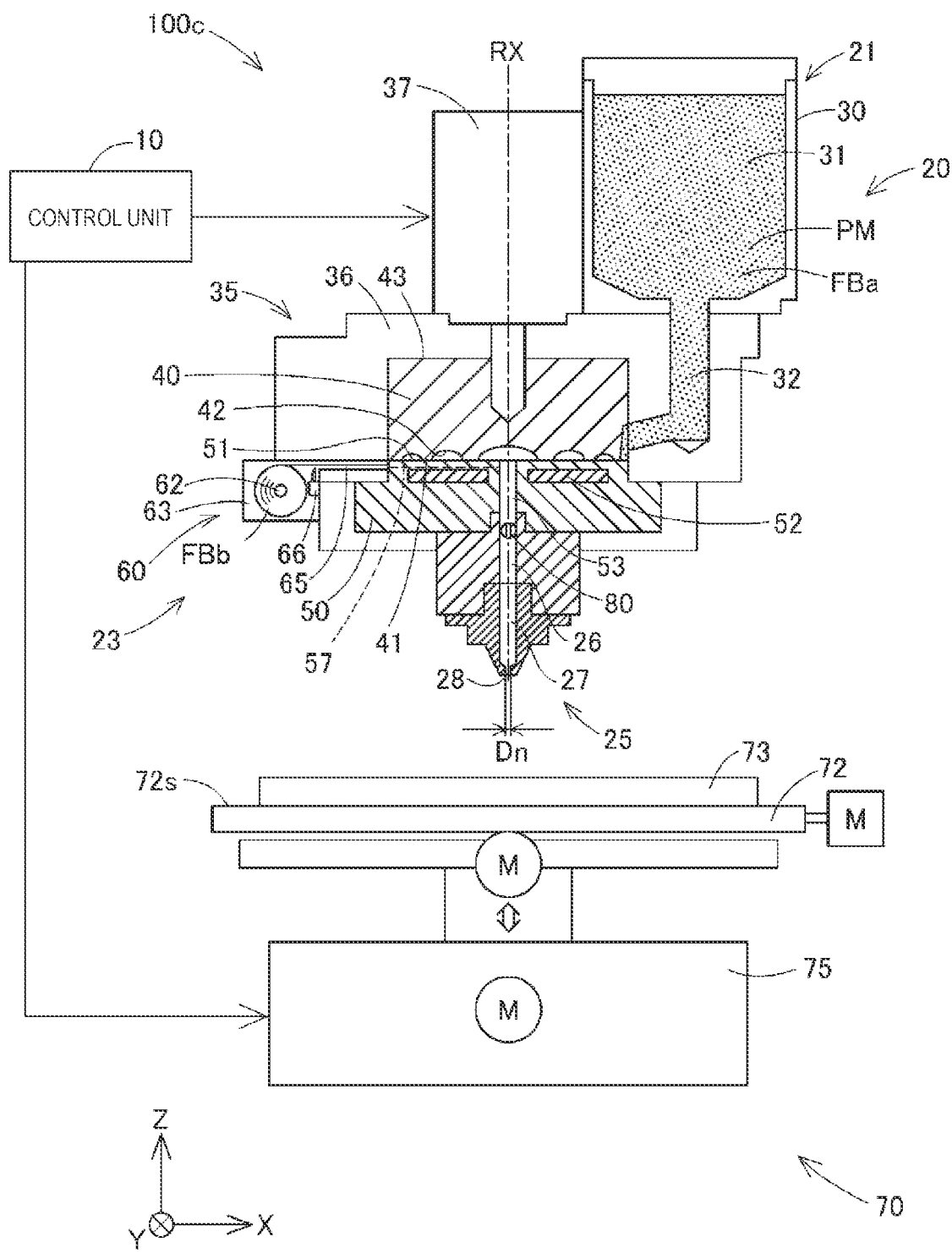
FIG. 12 is a schematic diagram showing a configuration of a three-dimensional shaping apparatus according to a fifth embodiment.

FIG. 12 is a schematic diagram showing a configuration of a shaping apparatus 100c according to a fifth embodiment. The shaping apparatus 100c according to the fifth embodiment has substantially the same configuration as the shaping apparatus 100a according to the first embodiment except for the following matters. In the shaping apparatus 100c, the facing surface 51 of the facing portion 50 has an introduction groove 57, and the conveying path 65 of the fiber introducing unit 23 is coupled to the introduction groove 57 instead of the introduction flow path 26 of the nozzle unit 25. In FIG. 12, the introduction groove 57 is shown by a broken line for convenience.

Figure 13:
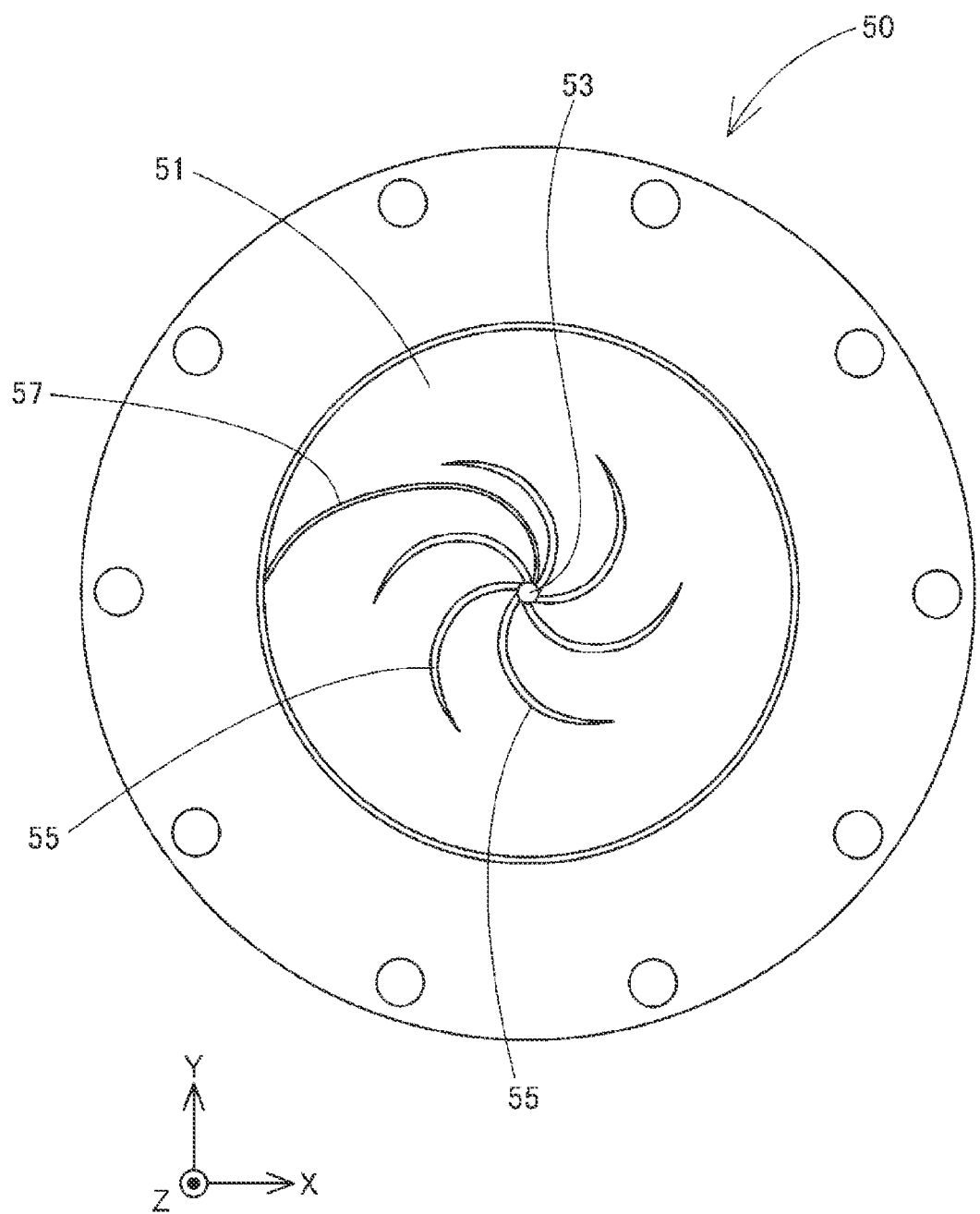
FIG. 13 is a schematic plan view showing a configuration of a facing surface of a facing portion according to the fifth embodiment.

FIG. 13 is a schematic plan view showing a configuration of the facing surface 51 of the facing portion 50 according to the fifth embodiment. The facing surface has a plurality of guide grooves 55 for guiding the plasticized material to the communication hole 53 located at the center of the facing surface 51, and the introduction groove 57 for introducing the second fiber material FBb. The introduction groove 57 is formed to avoid interference with the guide groove 55 from an outer peripheral end of the facing surface 51 to the communication hole 53. The second fiber material FBb can be guided to the communication hole 53 from a side of the flat screw 40 or the facing portion 50 through the introduction groove 57.

Figure 14:
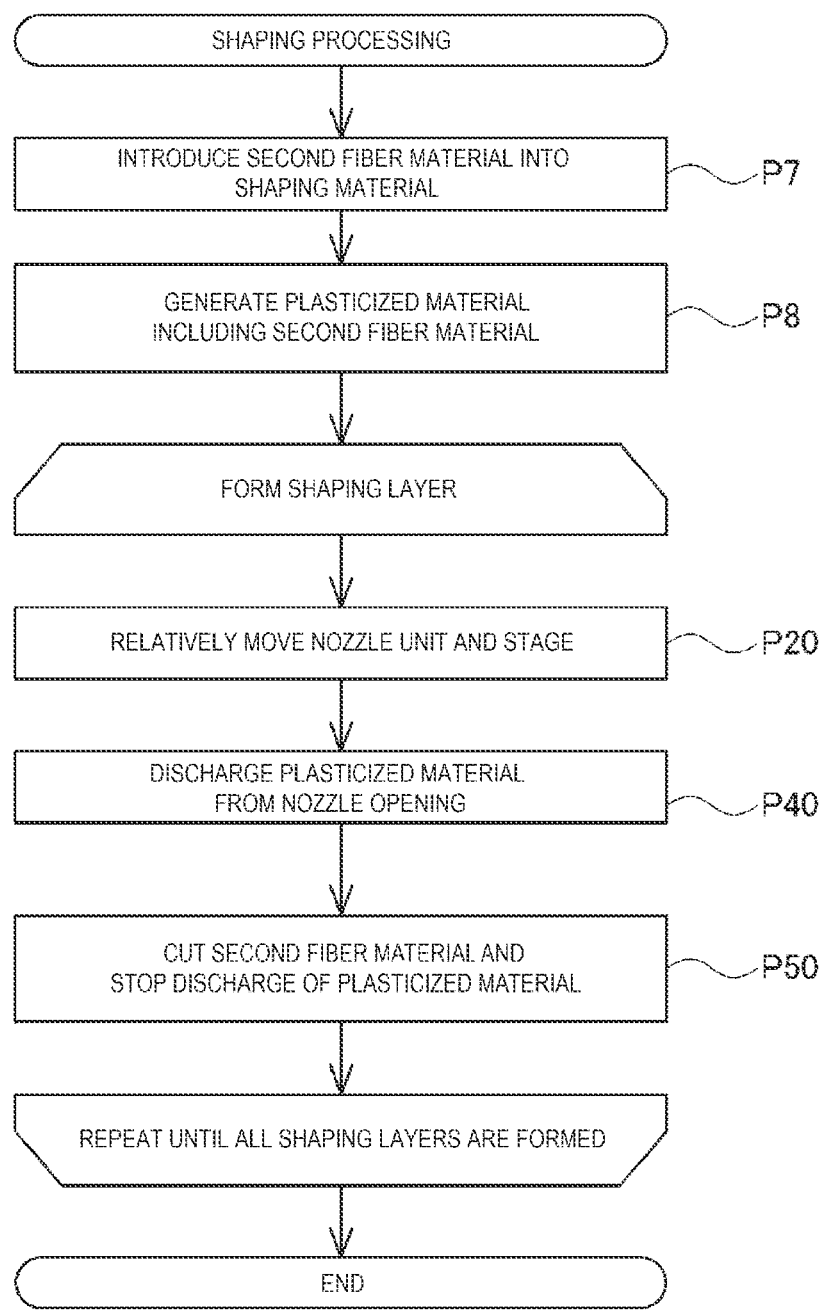
FIG. 14 is a flowchart showing steps executed in shaping processing according to the fifth embodiment.

FIG. 14 is a flowchart showing steps executed by the shaping apparatus 100c in shaping processing according to the fifth embodiment. The flowchart in FIG. 14 is substantially the same as the flowchart in FIG. 5 described in the first embodiment except that steps P7 and P8 are added instead of step P10 and step P30 is omitted. In the shaping apparatus 100c, the second fiber material FBb is supplied to the flat screw 40 of the plasticizing unit 35 together with the shaping material PM before plasticization, which is supplied from the material supply unit 30. That is, in the shaping apparatus 100c according to the fifth embodiment, the fiber introducing unit 23 has a function of introducing the second fiber material FBb into the shaping material PM, and the second fiber material FBb is introduced into the shaping material PM in step P7 in the shaping processing according to the fifth embodiment. In the subsequent step P8, at least a part of the shaping material PM into which the second fiber material FBb is introduced is plasticized in the flat screw 40 of the plasticizing unit 35, and a plasticized material including the second fiber material FBb is generated. Step P7 according to the fifth embodiment corresponds to a fiber introducing step of introducing the second fiber material FBb into the shaping material PM. Steps P7 and P8 according to the fifth embodiment correspond to the plasticizing step in the shaping processing according to the fifth embodiment. It is interpreted that the fiber introducing step in step P7 is executed in the plasticizing step.

According to the shaping apparatus 100c and the shaping processing thereof according to the fifth embodiment, the second fiber material FBb introduced into the shaping material PM can be guided to the communication hole 53 and discharged from the nozzle opening 28 by using a rotational force of the flat screw 40, which is efficient.

6 Sixth Embodiment

Figure 15:
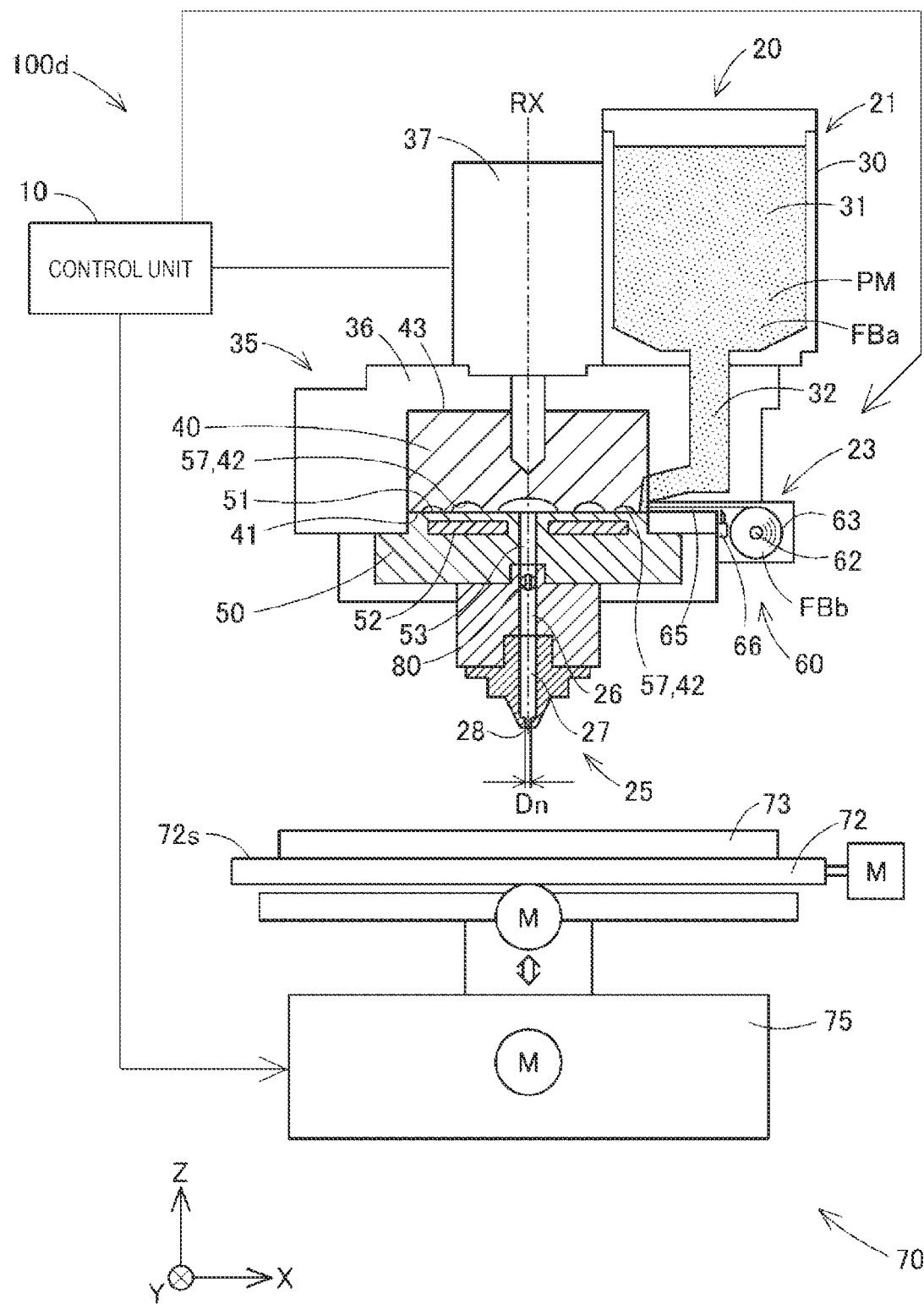
FIG. 15 is a schematic diagram showing a configuration of a three-dimensional shaping apparatus according to a sixth embodiment.

FIG. 15 is a schematic diagram showing a configuration of a shaping apparatus 100d according to a sixth embodiment. The shaping apparatus 100d according to the sixth embodiment has substantially the same configuration as the shaping apparatus 100a according to the first embodiment except for the following matters. In the shaping apparatus 100d, the conveying path 65 of the fiber introducing unit 23 is inserted into the screw case 36, and is capable of being coupled to the groove portion 42 from the side of the flat screw 40. In the sixth embodiment, the groove portion 42 of the flat screw 40 functions as the introduction groove 57 that guides the second fiber material FBb from the side of the flat screw 40 or the facing portion 50 to the communication hole 53. According to the shaping apparatus 100d according to the sixth embodiment, similarly to the shaping apparatus 100c according to the fifth embodiment, the second fiber material FBb can be guided to the communication hole 53 through the introduction groove 57 and discharged from the nozzle opening 28 by using the rotational force of the flat screw 40, which is efficient.

7 Seventh Embodiment

Figure 16:
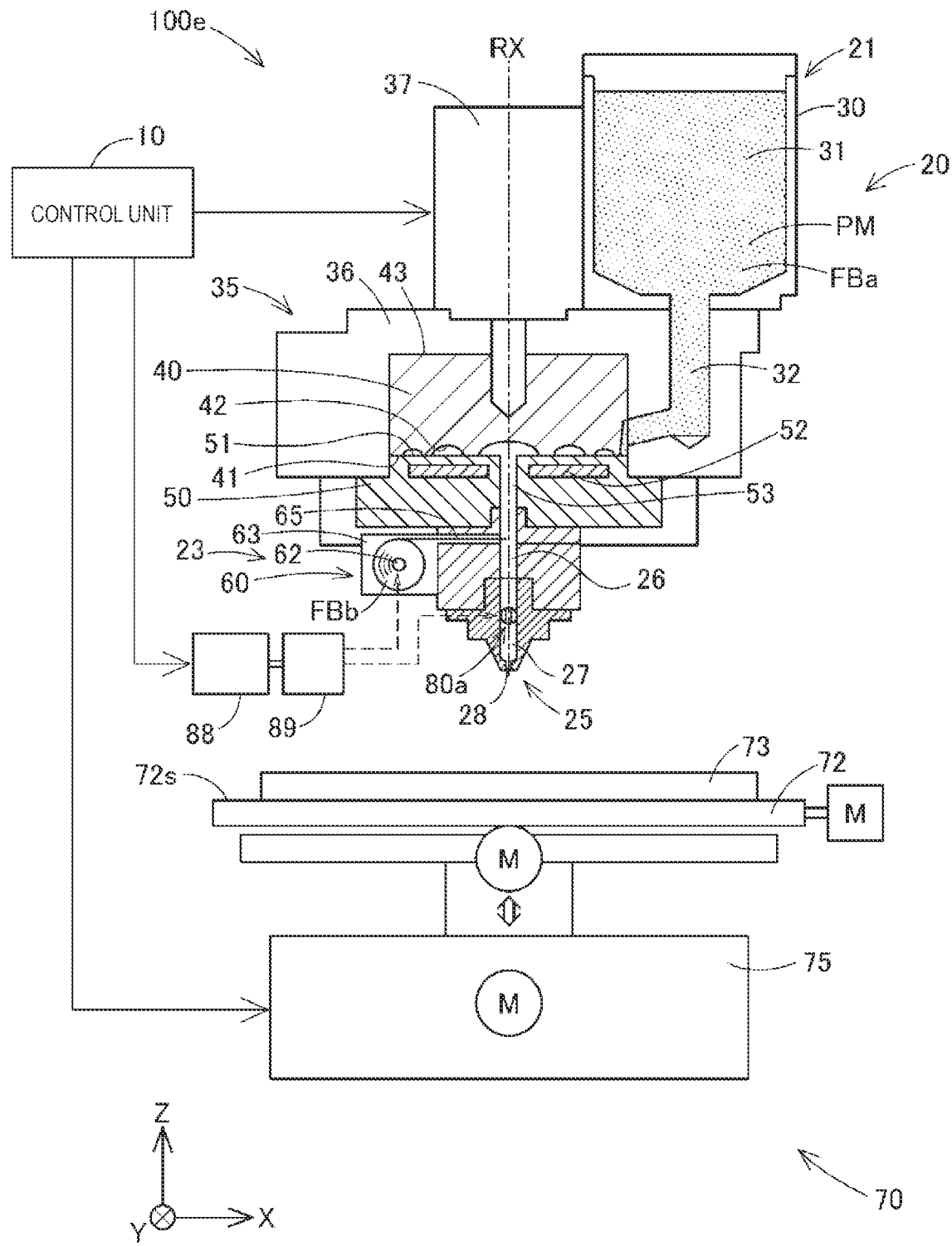
FIG. 16 is a schematic diagram showing a configuration of a three-dimensional shaping apparatus according to a seventh embodiment.

FIG. 16 is a schematic diagram showing a configuration of a shaping apparatus 100e according to a seventh embodiment. The shaping apparatus 100e according to the seventh embodiment has substantially the same configuration as the shaping apparatus 100a according to the first embodiment except for the following matters. In the shaping apparatus 100e, the cutting unit 66 provided in the accommodation unit 63 of the fiber introducing unit 23 is omitted. The shaping apparatus 100e includes a discharge amount control mechanism 80a that is provided upstream of the nozzle opening 28 and that controls the discharge amount of the plasticized material from the nozzle opening 28. As will be described later, the discharge amount control mechanism 80a according to the seventh embodiment has a function as the cutting unit that cuts the second fiber material FBb. The shaping apparatus 100e further includes a motor 88 that generates a driving force, and a gear unit 89 that switches a transmission destination of the driving force of the motor 88 to the discharge amount control mechanism 80a or the conveying unit 60 of the fiber introducing unit 23. The motor 88 is configured by, for example, a stepping motor. The switching of the transmission destination of the driving force of the motor 88 by the control unit 10 will be described later.

Figure 17:
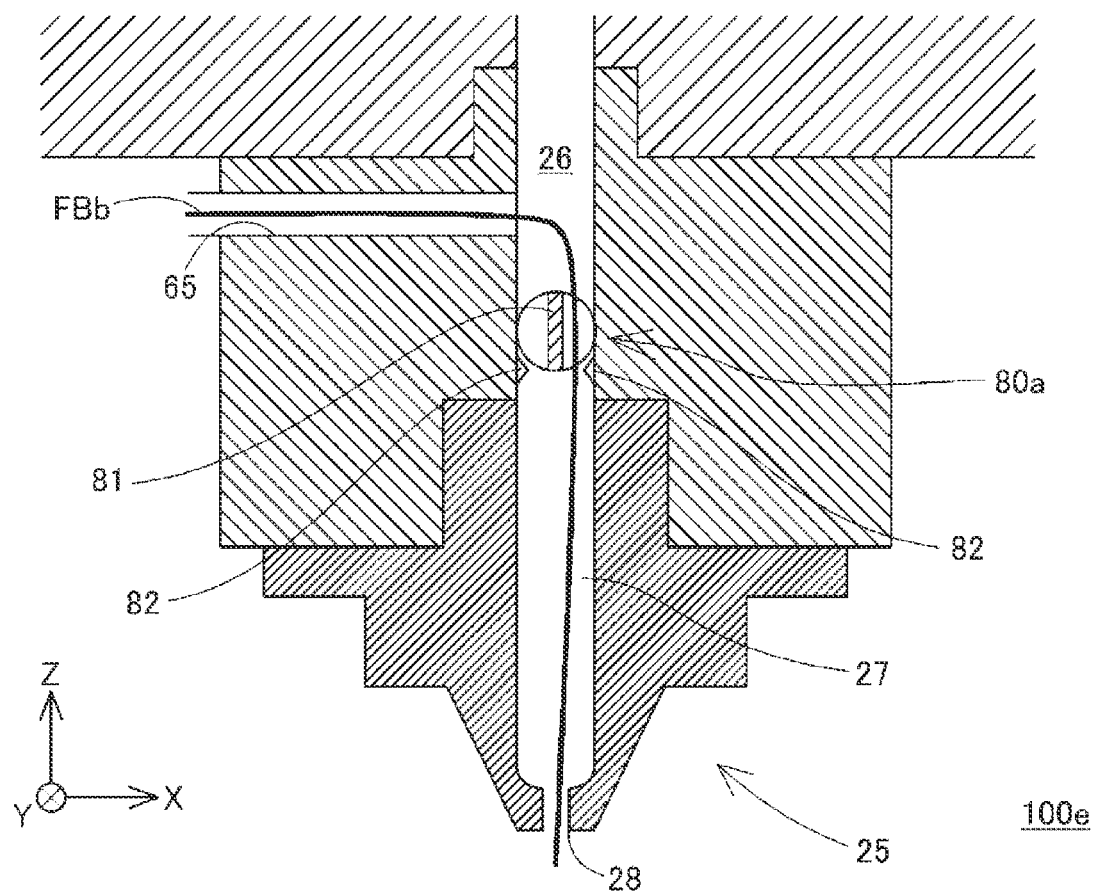
FIG. 17 is a schematic diagram showing a configuration of a discharge amount control mechanism according to a seventh embodiment.

FIG. 17 is a schematic diagram showing a configuration of the discharge amount control mechanism 80a according to the seventh embodiment. FIG. 17 schematically shows a state in which the discharge amount control mechanism 80a opens a flow path and the second fiber material FBb passes through the opened flow path. The discharge amount control mechanism 80a includes a butterfly valve 81, which is a valve element that rotates in the introduction flow path 26, and a cutter blade 82 provided around the butterfly valve 81. The butterfly valve 81 is rotated by the driving force of the motor 88 shown in FIG. 16, and changes an opening area of the introduction flow path 26 according to a rotation angle of the butterfly valve 81. The control unit 10 controls the discharge amount of the plasticized material from the nozzle opening 28 based on the rotation angle of the butterfly valve 81. The cutter blade 82 is provided at a position close to a rotation area of the butterfly valve 81.

Figure 18:
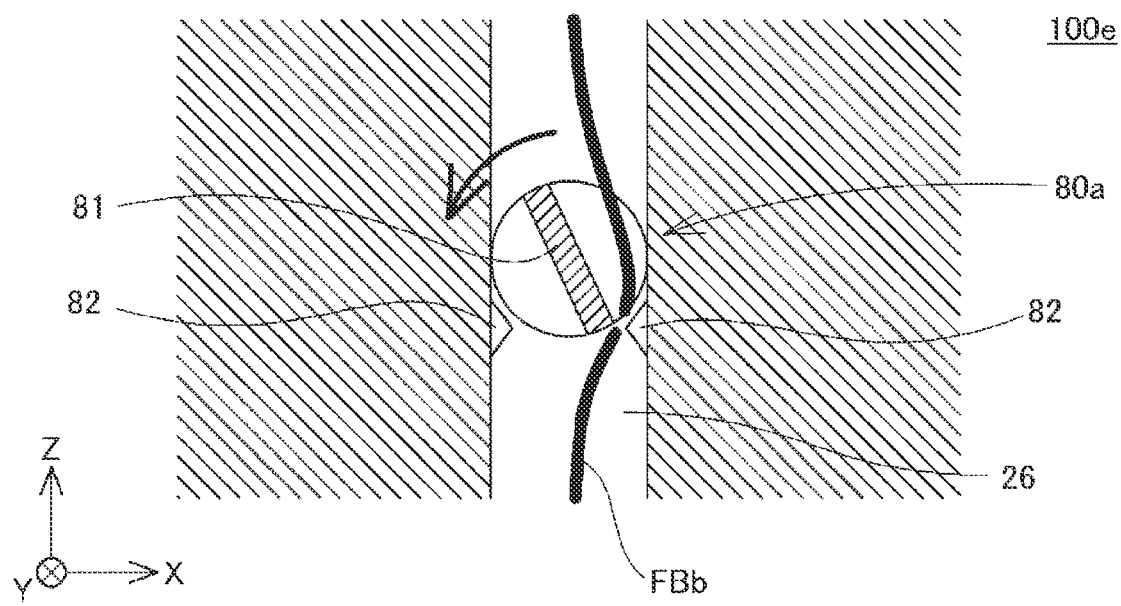
FIG. 18 is a schematic diagram showing a mechanism in which the discharge amount control mechanism according to the seventh embodiment cuts a fiber material.

FIG. 18 is a schematic diagram illustrating a mechanism in which the discharge amount control mechanism 80a cuts the second fiber material FBb. FIG. 18 schematically shows how the butterfly valve 81 of the discharge amount control mechanism 80a is rotated to cut the second fiber material FBb from the state shown in FIG. 17. When the control unit 10 rotates the butterfly valve 81 to close the introduction flow path 26, the second fiber material FBb is sandwiched between an end portion of the butterfly valve 81 during rotation and the cutter blade 82, and is pressed against and cut by the cutter blade 82. After the second fiber material FBb is cut, the butterfly valve 81 continues to rotate and closes the introduction flow path 26.

The shaping apparatus 100e according to the seventh embodiment executes shaping processing by the steps shown in FIG. 5 described in the first embodiment. In the shaping processing, the control unit 10 controls the motor 88 to drive and controls the gear unit 89 to switch the transmission destination of the driving force generated by the motor 88. When the second fiber material FBb is introduced in the fiber introducing step in step P30, the control unit 10 transmits the driving force generated by the motor 88 to the conveying unit 60 with the gear unit 89 and uses the driving force to convey the second fiber material FBb. When starting the discharge of the plasticized material from the nozzle opening 28 in step P40, in order to adjust the discharge amount, the control unit 10 temporarily switches the transmission destination of the driving force generated by the motor 88 to the discharge amount control mechanism 80a with the gear unit 89. Accordingly, the butterfly valve 81 of the discharge amount control mechanism 80a can be rotated by the driving force generated by the motor 88, and the discharge amount of the plasticized material can be controlled. In step P50, when stopping the discharge of the plasticized material, the control unit 10 switches the transmission destination of the driving force generated by the motor 88 from the conveying unit 60 to the discharge amount control mechanism 80a, and rotates the butterfly valve 81. Accordingly, the second fiber material FBb is cut, and the discharge of the plasticized material from the nozzle openings 28 is stopped. As described above, step P50 includes a cutting step of cutting the second fiber material FBb by operating the discharge amount control mechanism 80a.

According to the shaping apparatus 100e according to the seventh embodiment, since the conveying unit 60 of the fiber introducing unit 23 and the discharge amount control mechanism 80a can be driven by the common motor 88, a size of the apparatus configuration can be reduced. According to the shaping apparatus 100e according to the seventh embodiment, since the discharge amount control mechanism 80a can stop the discharge of the plasticized material at the same time as cutting the second fiber material FBb, controllability of the discharge of the plasticized material from the nozzle opening 28 is further improved.

8 Eighth Embodiment

Figure 19:
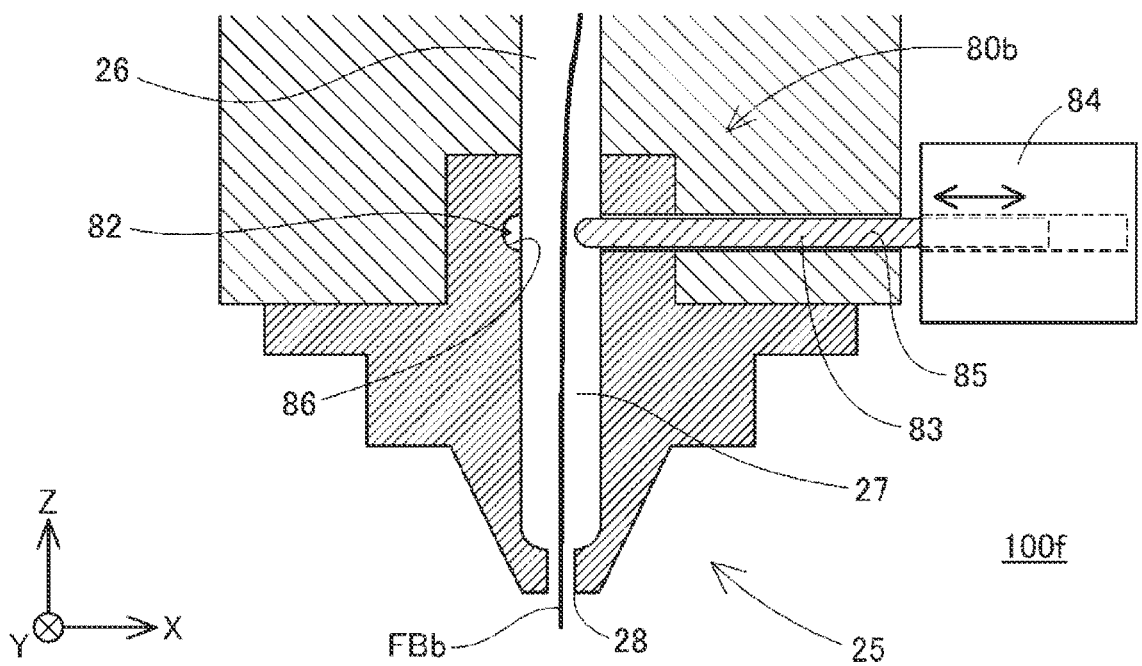
FIG. 19 is a schematic diagram showing a configuration of a discharge amount control mechanism according to an eighth embodiment.

FIG. 19 is a schematic diagram showing a configuration of a discharge amount control mechanism 80b included in a shaping apparatus 100f according to an eighth embodiment. FIG. 19 schematically shows a state in which a rod 83 of the discharge amount control mechanism 80b is positioned at an initial position, which will be described later, and the second fiber material FBb is being send to the nozzle flow path 27.

The shaping apparatus 100f according to the eighth embodiment has substantially the same configuration as the shaping apparatus 100e according to the seventh embodiment except for the following matters. The shaping apparatus 100f includes the discharge amount control mechanism 80b having a configuration different from that of the discharge amount control mechanism 80a described in the seventh embodiment. The discharge amount control mechanism 80b according to the eighth embodiment is provided in the nozzle flow path 27. The discharge amount control mechanism 80b realizes, by moving the rod 83 in a direction intersecting the nozzle flow path 27 by a plunger mechanism, a function of controlling the discharge amount of the shaping material by opening and closing the nozzle flow path 27 and a function of cutting the second fiber material FBb. The shaping apparatus 100f, which is not shown, has a butterfly valve similar to the discharge amount control mechanism 80 described in the first embodiment on upstream of the discharge amount control mechanism 80b, and can stop the discharge of the plasticized material from the nozzle opening 28 by opening and closing the butterfly valve.

The discharge amount control mechanism 80b includes the rod 83 that performs a piston motion in the direction intersecting the nozzle flow path 27, a drive mechanism 84 that drives the rod 83, a recessed portion 86 formed at the internal wall surface of the nozzle flow path 27, and the cutter blade 82 provided in the recessed portion 86. The rod 83 moves in a branch flow path 85 that is coupled to the nozzle flow path 27. Similarly to the discharge amount control mechanism 80a according to the seventh embodiment, the discharge amount control mechanism 80b according to the eighth embodiment receives a driving force of the rod 83 from the motor 88 common to the conveying unit 60 shown in FIG. 16. The drive mechanism 84 instantaneously moves the rod 83 by converting a rotational motion generated by the motor 88 into a linear motion.

First, in a mechanism for controlling the discharge amount of the plasticized material by the discharge amount control mechanism 80b will be described. When the rod 83 is instantaneously moved to a deep position in the branch flow path 85, the plasticized material is drawn into the branch flow path 85 in accordance with the movement of the rod 83. Thus, a negative pressure is generated in the nozzle flow path 27, and the plasticized material discharged from the nozzle opening 27 is pulled back to the nozzle flow path 27, so that the discharge of the plasticized material from the nozzle opening 28 can be temporarily stopped. In contrast, when the rod 83 is moved from the deep position in the branch flow path 85 toward the nozzle flow path 27, the plasticized material in the branch flow path 85 is extruded into the nozzle flow path 27, and the discharge amount of the plasticized material can be temporarily increased. Thus, the discharge amount control mechanism 80b can control the discharge amount of the plasticized material from the nozzle opening 28 by the movement of the rod 83.

Next, a mechanism for cutting the fiber material FB by the discharge amount control mechanism 80b will be described. The rod 83 can be instantaneously moved to protrude from the branch flow path 85 into the nozzle flow path 27. A tip of the rod 83 that is protruded into the nozzle flow path 27 is received by the recessed portion 86. The second fiber material FBb is cut by a movement of the rod 83 of protruding toward the recessed portion 86 as described below.

Figure 20:
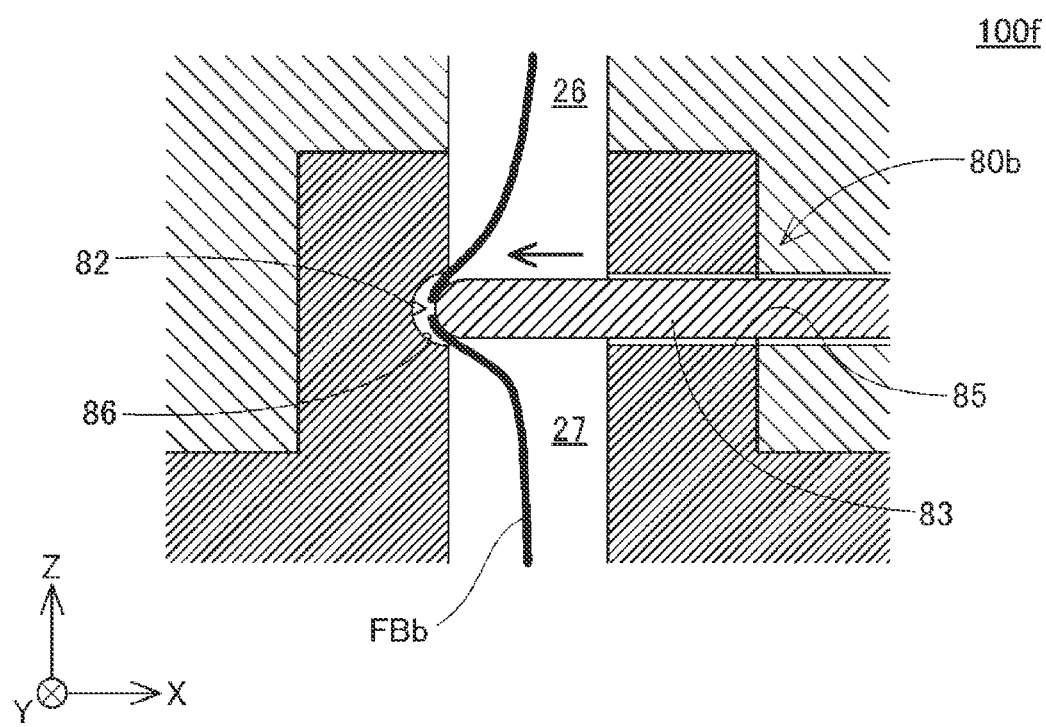
FIG. 20 is a schematic diagram showing a mechanism in which the discharge amount control mechanism according to the eighth embodiment cuts a fiber material.

FIG. 20 is a schematic diagram illustrating a mechanism in which the discharge amount control mechanism 80b according to the eighth embodiment cuts the second fiber material FBb. FIG. 20 schematically shows how the rod 83 of the discharge amount control mechanism 80b is moved, from the state shown in FIG. 19, in a direction in which the rod 83 protrudes into the nozzle flow path 27 to cut the second fiber material FBb. As described above, the cutter blade 82 is provided in the recessed portion 86 that receives the tip of the rod 83. When the rod 83 is instantaneously moved toward the recessed portion 86, the second fiber material FBb is sandwiched between the tip of the rod 83 and the cutter blade 82 in the recessed portion 86, and is pressed against and cut by the cutter blade 82.

When the butterfly valve provided upstream of the control unit 10 is closed to stop the discharge of the plasticized material from the nozzle opening 28 or when the butterfly valve is opened to restart the discharge of the plasticized material, the control unit 10 of the shaping apparatus 100f drives the discharge amount control mechanism 80b as described below. While the plasticized material is discharged from the nozzle opening 28, the rod 83 of the discharge amount control mechanism 80b is located at a position where the tip of the rod 83 closes an outlet of the branch flow path 85 as shown in FIG. 19. Hereinafter, this position is also referred to as an "initial position".

When the butterfly valve is closed, the control unit 10 drives the discharge amount control mechanism 80b to instantaneously move the rod 83 toward the recessed portion 86 to protrude from the initial position to the nozzle flow path 27, thereby cutting the second fiber material FBb. Thereafter, the negative pressure is generated in the nozzle flow path 27 by instantaneously moving the rod 83 to the deep position in the branch flow path 85 without leaving a gap therebetween. Accordingly, the plasticized material flowing out from the nozzle opening 28 is pulled back to the nozzle flow path 27, so that the excessive plasticized material can be prevented from dripping from the nozzle opening 28 in a string-like manner after the discharge of the plasticized material is stopped.

When the butterfly valve is opened to restart the discharge of the plasticized material, the control unit 10 returns the rod 83 that is located at the deep position in the branch flow path 85 to the initial position, thereby returning the plasticized material that is drawn into the branch flow path 85 to the nozzle flow path 27. Accordingly, the discharge amount of the plasticized material can be temporarily increased when the discharge of the plasticized material from the nozzle opening 28 is restarted. Therefore, the restart of the discharge of the plasticized material can be prevented from being delayed due to an insufficient amount of the plasticized material supplied to the nozzle flow path 27 when the discharge of the plasticized material is restarted.

Thus, with the discharge amount control mechanism 80b, when the discharge of the plasticized material from the nozzle opening 28 is stopped, an outflow of the plasticized material from the nozzle opening 28 can be quickly stopped while cutting the second fiber material FBb. When the discharge of the plasticized material from the nozzle opening 28 is restarted, the plasticized material in the branch flow path 85 is extruded by the rod 83, and the discharge amount of the plasticized material from the nozzle opening 28 can be rapidly returned to a target value. That is, with the discharge amount control mechanism 80b, a higher responsiveness of the discharging unit 20 with respect to the discharge control of the plasticized material by the control unit 10 can be attained.

As described above, according to the shaping apparatus 100f according to the eighth embodiment, similarly to the shaping apparatus 100e according to the seventh embodiment, since the conveying unit 60 and the discharge amount control mechanism 80b are driven by the common motor 88, a size of the apparatus configuration can be reduced. Further, with the discharge amount control mechanism 80b, the controllability of the discharge of the shaping material including the second fiber material FBb can be further improved.

9 Ninth Embodiment

Figure 21:
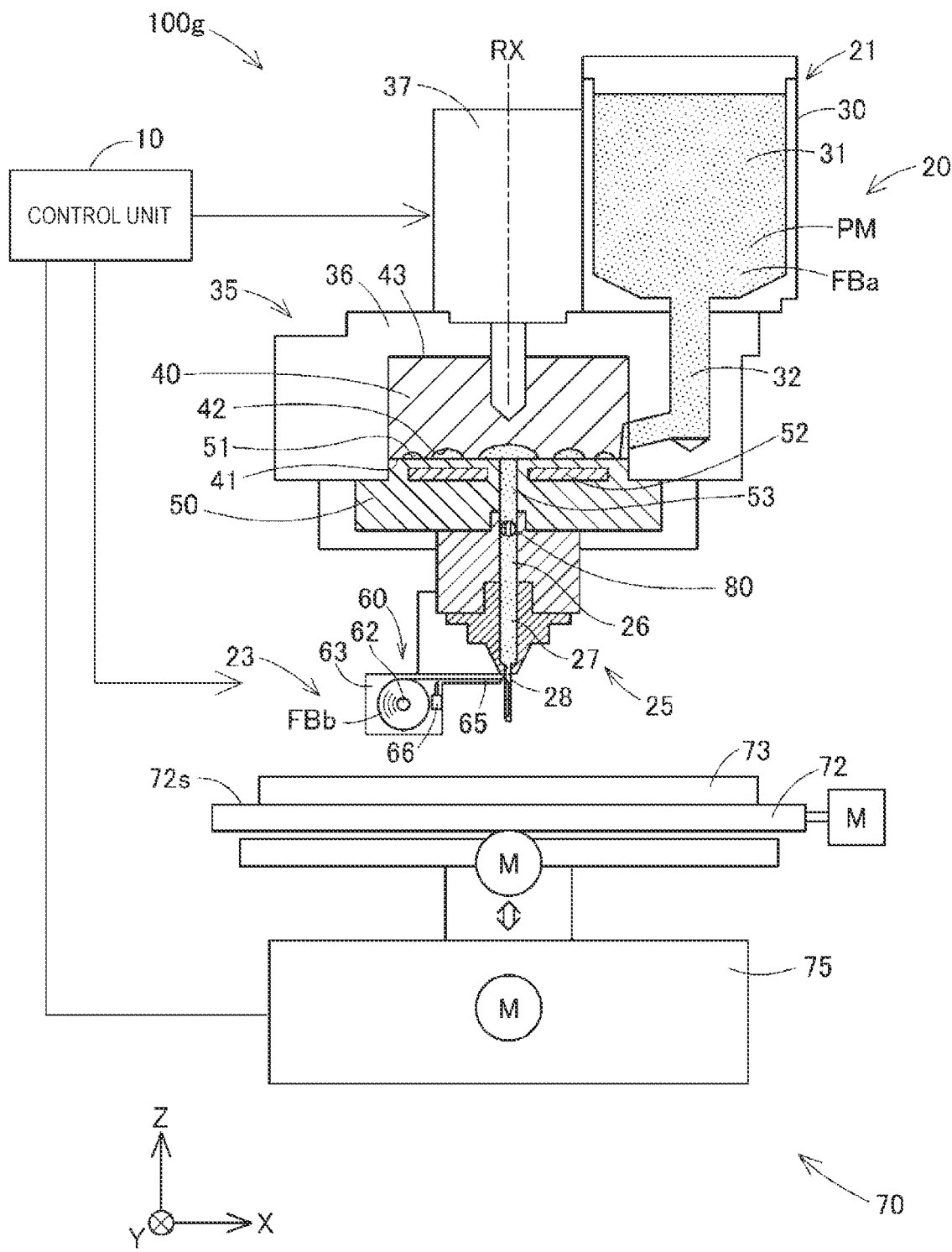
FIG. 21 is a schematic diagram showing a configuration of a three-dimensional shaping apparatus according to a ninth embodiment.

FIG. 21 is a schematic diagram showing a configuration of a shaping apparatus 100g according to a ninth embodiment. The shaping apparatus 100g according to the ninth embodiment has substantially the same configuration as the shaping apparatus 100a according to the first embodiment except for the following matters. In the shaping apparatus 100g according to the ninth embodiment, the conveying path 65 of the fiber introducing unit 23 is coupled to downstream of the nozzle opening 28. The fiber introducing unit 23 is fixed to the nozzle unit 25 so as to be relatively movable with respect to the stage 72 and the nozzle opening 28. In the shaping apparatus 100g, the fiber introducing unit 23 has a function of introducing the second fiber material FBb into the plasticized material after being discharged from the nozzle opening 28.

FIG. 22 is a flowchart showing steps executed by the shaping apparatus 100g in the shaping processing according to the ninth embodiment. The flowchart in FIG. 22 is substantially the same as the shaping processing shown in FIG. 5 described in the first embodiment except that step P30 is omitted and step P45 is added after step P40. In the shaping processing according to the ninth embodiment, after the plasticized material is discharged from the nozzle opening 28 in step P40, in step P45, the fiber introducing unit 23 introduces the second fiber material FBb into the plasticized material after being discharged from the nozzle opening 28. Step P45 corresponds to a fiber introducing step of introducing the second fiber material FBb into the plasticized material such that the plasticized material after being discharged from the nozzle opening 28 contains the second fiber material FBb longer than the first fiber material FBa. In the ninth embodiment, steps P20 to P50 including the fiber introducing step in step P45 correspond to a shaping step of shaping a shaped object including the first fiber material FBa and the second fiber material FBb.

According to the shaping apparatus 100g according to the ninth embodiment, the fiber introducing unit 23 can be easily provided by retrofitting. According to the shaping apparatus 100g according to the ninth embodiment, since the second fiber material FBb does not pass through the nozzle opening 28, the fiber diameter of the second fiber material FBb can be made larger than the hole diameter Dn of the nozzle opening 28. In the ninth embodiment, the fiber diameter of the second fiber material FBb may be, for example, from 10 µm to 500 µm.

10 Other Embodiments

The various configurations described in the above embodiments can be modified, for example, as follows. Each of other embodiments described below is positioned as an example of a mode for implementing the present disclosure, similarly to each of the embodiments described above.

10-1 Another Embodiment 1

In the above embodiments, the continuous second fiber material FBb wound around the reel 62 may not be used. The second fiber material FBb that has a longer length than the first fiber material FBa and that is finely divided may be introduced into the plasticized material so as to be included in the plasticized material after being discharged from the nozzle opening 28. The finely divided second fiber material FBb may be, for example, introduced into the shaping material PM together with the first fiber material FBa. The finely divided second fiber material FBb may be introduced into the plasticized material before being discharged from the nozzle opening 28 by being poured into the central portion 45 of the flat screw 40 through the conveying path 65 shown in FIG. 9, for example.

10-2 Another Embodiment 2

In each of the above embodiments, instead of plasticizing the thermoplastic resin with the flat screw 40 to generate the plasticized material included in the plasticized material, the plasticized material may be generated by another method. For example, the plasticized material may be generated with an in-line screw.

10-3 Another Embodiment 3

In the above second embodiment, the first portion Pf may not constitute the outline of the shaped object, and the second portion Ps may not constitute the internal structure of the shaped object. The first portion Pf may be a portion of the internal structure of the shaped object, and the second portion Ps may be a portion constituting the outline.

10-4 Another Embodiment 4

In the above fourth embodiment, the pressure control unit 90 may be omitted. In this case, in order to prevent the plasticized material from flowing into the conveying path 65 of the second fiber material FBb from the flat screw 40, for example, a portion where a gap between the through hole 47 and the second fiber material FBb becomes small may be locally provided, or a check valve structure for preventing the plasticized material from flowing into the conveying path 65 may be provided.

10-5 Another Embodiment 5

In the above sixth embodiment, the introduction groove 57 for introducing the second fiber material FBb may be formed in the flat screw 40 separately from the groove portion 42 that functions as the flow path of the plasticized material.

10-6 Another Embodiment 6

In the above ninth embodiment, the fiber introducing unit 23 may not be fixed to the nozzle unit 25. The fiber introducing unit 23 may be configured by, for example, a robot that embeds the second fiber material FBb in the plasticized material discharged to the stage 72 under the control of the control unit 10.

10-7 Another Embodiment 7

The configurations described in the above embodiments can be appropriately extracted and combined. For example, the shaping processing according to the second embodiment shown in FIG. 7 may be executed by any one of the shaping apparatuses 100b, 100c, 100d, 100e, 100f, and 100g according to the fourth embodiment, the fifth embodiment, the sixth embodiment, the seventh embodiment, the eighth embodiment, and the ninth embodiment. The introduction speed control step in step P25 according to the third embodiment may be applied to the above embodiments other than the third embodiment. When the introduction speed control step is applied to the fifth embodiment or the sixth embodiment, the introduction speed is a speed at which the second fiber material FBb is introduced into the shaping material. The through hole 47 of the flat screw 40 according to the fourth embodiment or the introduction groove 57 according to the fifth embodiment or the sixth embodiment may be added to the shaping apparatus 100a, 100e, and 100f according to the first embodiment or other embodiments. The pressure control unit 90 according to the fourth embodiment may be applied to the conveying units 60 according to the above embodiments. In this case, the pressure control unit 90 may control a pressure in the conveying path 65 to be higher than a pressure in the flow path of the plasticized material. The configuration in which the transmission destination of the driving force of the motor 88 is switched by the gear unit 89 according to the above seventh embodiment or the above eighth embodiment, and the configurations of the discharge amount control mechanisms 80a and 80b having the function of cutting the second fiber material FBb may be applied to the embodiments other than the seventh embodiment and the eighth embodiment.

10-8 Another Embodiment 8

The discharge amount control mechanism 80b according to the above eighth embodiment may include, instead of the rod 83, a shutter valve capable of closing the nozzle flow path 27. In this case, the shutter valve is moved toward the recessed portion 86 by the drive mechanism 84 and received by the recessed portion 86, so that the nozzle flow path 27 can be closed to stop the discharge of the plasticized material from the nozzle opening 28 while cutting the second fiber material FBb.

10-9 Another Embodiment 9

In each of the above embodiments, a method for manufacturing a three-dimensional shaped object including the following steps may be applied. The method for manufacturing a three-dimensional shaped object is executed by a three-dimensional shaping apparatus that manufactures a three-dimensional shaped object by laminating a shaping layer. The method includes a selection step of selecting a fiber material corresponding to a thickness of the shaping layer from a plurality of types of fiber materials having different fiber diameters, and a shaping step of forming the shaping layer by discharging a shaping material that includes the fiber material selected in the selection step from a nozzle opening. According to the manufacturing method according to this aspect, the three-dimensional shaping apparatus selects fiber materials having appropriate fiber diameters according to a thickness of the shaping layer from the plurality of types of fiber materials, and introduces the selected fiber materials into the shaping layer. Therefore, the shaping layer includes the fiber materials having appropriate fiber diameters, and strength of the three-dimensional shaped object can be enhanced. A decrease in productivity of the three-dimensional shaped object due to times and efforts required for replacing and loading the fiber materials having different fiber diameters to the three-dimensional shaping apparatus can be prevented.

10-10 Another Embodiment 10

In each of the above embodiments, a method for manufacturing a three-dimensional shaped object including the following steps may be applied. The method for manufacturing a three-dimensional shaped object includes: a plasticizing step of plasticizing at least a part of a material for shaping including a thermoplastic resin to generate a plasticized material; a fiber introducing step including at least one of a step of introducing a covered fiber material, which is a fiber material covered with a covering material, into the plasticized material after being discharged from a nozzle opening, and a step of introducing the covered fiber material into the shaping material or the plasticized material before being discharged from the nozzle opening; and a shaping step of shaping a three-dimensional shaped object that includes the covered fiber material. According to the manufacturing method according to this aspect, in the fiber introducing step, the covering material that covers a surface of the covered fiber material can prevent air bubbles from adhering to a surface of the fiber material and mixing into the plasticized material. Therefore, a decrease in strength of the three-dimensional shaped object due to the mixing of the air bubbles into the plasticized material can be prevented.

11 Overview (1) A method for manufacturing a three-dimensional shaped object according to an aspect of the present disclosure includes: a plasticizing step of plasticizing at least a part of a shaping material including a first fiber material and a thermoplastic resin to generate a plasticized material to be discharged from a nozzle opening for shaping the three-dimensional shaped object; a fiber introducing step including either a step of introducing a second fiber material longer than the first fiber material into the shaping material or the plasticized material before being discharged from the nozzle opening, or a step of introducing the second fiber material into the plasticized material after being discharged from the nozzle opening; and a shaping step of shaping the three-dimensional shaped object that includes the first fiber material and the second fiber material. According to the method for manufacturing a three-dimensional shaped object according to this aspect, the first fiber material and the second fiber material having different lengths can be combined and mixed in the three-dimensional shaped object so as to reinforce each other's strength in various directions. Therefore, strength of the three-dimensional shaped object in various directions can be easily improved.

(2) In the manufacturing method according to the above aspect, the shaping step may include a first shaping step of forming a first portion that is a part of the three-dimensional shaped object and that includes the first fiber material and the second fiber material, and a second shaping step of forming a second portion that is a part of the three-dimensional shaped object and that includes the first fiber material and does not include the second fiber material. According to the method for manufacturing a three-dimensional shaped object according to this aspect, the first portion that includes both the first fiber material and the second fiber material and the second portion that does not include the second fiber material having a long length can be selectively formed. Accordingly, a degree of freedom for shaping the three-dimensional shaped object can be increased.

(3) In the manufacturing method according to the above aspect, the shaping step may include: a moving step of relatively moving a stage configured to support the three-dimensional shaped object and a nozzle unit having the nozzle opening; and an introduction speed control step of changing an introduction speed at which the second fiber material is introduced into the shaping material or the plasticized material in accordance with a relative movement speed between the nozzle unit and the stage in the moving step. According to the method for manufacturing a three-dimensional shaped object according to this aspect, it is possible to prevent an amount or a state of the fiber material to be introduced into the shaping layer from being changed due to a change in the relative movement speed between the nozzle opening and the stage during the shaping of the three-dimensional shaped object.

(4) In the manufacturing method according to the above aspect, the plasticizing step may include, in a plasticizing apparatus that includes a flat screw having a groove forming surface in which a groove portion is formed, a facing portion that has a facing surface facing the groove forming surface and that is formed with a communication hole communicating with the nozzle opening, and a heater configured to heat the flat screw or the facing portion, a step of guiding the shaping material supplied between the flat screw and the facing portion to the communication hole while plasticizing the shaping material by rotation of the flat screw and heating of the heater. According to the manufacturing method according to this aspect, a size of an apparatus for executing the plasticizing step can be reduced with the flat screw in the plasticizing step. Further, since the control of the pressure and the flow rate of the plasticized material supplied to the nozzle opening is facilitated by the rotation control of the flat screw, accuracy of discharging the plasticized material can be increased, and accuracy of shaping the three-dimensional shaped object can be increased.

(5) In the method for manufacturing a three-dimensional shaped object according to the above aspect, the flat screw may have a through hole that is opened in the groove forming surface and that communicates with the communication hole, and the fiber introducing step may include a step of introducing the second fiber material into the plasticized material before being discharged from the nozzle opening through the through hole. According to the manufacturing method according to this aspect, the fiber material can be smoothly introduced into the communication hole of the facing portion through the through hole of the flat screw.

(6) The method for manufacturing a three-dimensional shaped object according to the above aspect may further include a pressure control step of controlling a pressure in the through hole to be higher than a pressure in the communication hole. According to the manufacturing method according to this aspect, since the pressure in the through hole is controlled to be high, it is possible to prevent the plasticized material from flowing into the through hole and inhibit the introduction of the second fiber material.

(7) In the method for manufacturing a three-dimensional shaped object according to the above aspect, the groove forming surface or the facing surface may have an introduction groove that guides the second fiber material from a side of the flat screw or the facing portion to the communication hole. The fiber introducing step may include a step of introducing the second fiber material into the shaping material through the introduction groove. According to the manufacturing method according to this aspect, the second fiber material can be guided to the communication hole and discharged from the nozzle opening by using the rotational force of the flat screw, which is efficient.

(8) The manufacturing method according to the above aspect may further include a cutting step of cutting the second fiber material. According to the manufacturing method according to this aspect, by cutting the second fiber material, adjustment of the length of the second fiber material, control of stopping the introduction of the second fiber material, and the like can be easily performed.

(9) In the manufacturing method according to the above aspect, the cutting step may include a step of cutting the second fiber material by operating a discharge amount control mechanism that is provided upstream of the nozzle opening and that controls a discharge amount of the plasticized material. According to the manufacturing method according to this aspect, the discharge amount control mechanism can control the discharge amount of the plasticized material and the introduction of the fiber material into the plasticized material, which is efficient.

(10) In the method for manufacturing a three-dimensional shaped object according to the above aspect, the discharge amount control mechanism may be driven by a motor, and the fiber introducing step may include a step of transmitting a driving force generated by the motor to a conveying unit of the second fiber material and using the driving force as a conveying force to convey the second fiber material.

According to the manufacturing method according to this aspect, since the conveying unit and the discharge amount control mechanism can be driven by the common motor, a size of the apparatus configuration can be reduced.

(11) A three-dimensional shaping apparatus according to an aspect of the present disclosure includes: a plasticizing unit configured to plasticize at least a part of a shaping material including a first fiber material and a thermoplastic resin to generate a plasticized material for shaping a three-dimensional shaped object; a discharging unit having a nozzle opening for discharging the plasticized material; a fiber introducing unit having either a function of introducing a second fiber material longer than the first fiber material into the shaping material or the plasticized material before being discharged from the nozzle opening, or a function of introducing the second fiber material into the plasticized material after being discharged from the nozzle opening; and a control unit configured to control the plasticizing unit, the discharging unit, and the fiber introducing unit to shape the three-dimensional shaped object including the first fiber material and the second fiber material. According to the three-dimensional shaping apparatus according to this aspect, since the first fiber material having a short length and the second fiber material having a long length can be combined and mixed in the plasticized material so as to reinforce each other's strength in various directions, the strength of the three-dimensional shaped object in various directions can be easily enhanced.

What is claimed is:

1. A method for manufacturing a three-dimensional shaped object, the method comprising:
    a plasticizing step of plasticizing at least a part of a shaping material including a first fiber material and a thermoplastic resin to generate a plasticized material to be discharged from a nozzle opening for shaping a three-dimensional shaped object, the plasticizing step includes, in a plasticizing apparatus that includes a flat screw having a groove forming surface in which a groove portion is formed, a facing portion that has a facing surface facing the groove forming surface and that is formed with a communication hole communicating with the nozzle opening, plasticizing the shaping material by rotation of the flat screw, at least one of the groove forming surface and the facing surface comprises an introduction groove, the introduction groove of the groove forming surface being a groove separate from the groove portion;
    a fiber introducing step including a step of introducing a second fiber material longer than the first fiber material into the shaping material before being discharged from the nozzle opening, the second fiber material being introduced into the shaping material through the introduction groove that guides the second fiber material from a side of the flat screw or the facing portion to the communication hole;
    a cutting step of cutting the second material by operating a discharge amount control mechanism that is provided upstream from the nozzle opening and that controls a discharge amount of the plasticized material, the discharge amount control mechanism has a valve that rotates about an axis intersecting a direction in which an introduction flow path extends and a rod located downstream of the valve and disposed in a branch flow path connected to the introduction flow path, the branch flow path extending along a direction intersecting the direction in which the introduction flow path extends, and
    wherein in the cutting step, the second fiber is sandwiched and cut between
        the valve and the cutter blade, which is disposed in the introduction flow path, by rotating the valve, or
        the rod and a cutter which is disposed within a recess of the introduction flow path, by moving a top of the rod towards the recess; and
    a shaping step of shaping the three-dimensional shaped object including the first fiber material and the second fiber material.

2. The method for manufacturing a three-dimensional shaped object according to claim 1, wherein
    the shaping step includes
    a first shaping step of forming a first portion that is a part of the three-dimensional shaped object and that includes the first fiber material and the second fiber material; and
    a second shaping step of forming a second portion that is a part of the three-dimensional shaped object and that includes the first fiber material and does not include the second fiber material.

3. The method for manufacturing a three-dimensional shaped object according to claim 1, wherein
    the shaping step includes
    a moving step of relatively moving a stage configured to support the three-dimensional shaped object and a nozzle unit having the nozzle opening; and
    an introduction speed control step of changing an introduction speed at which the second fiber material is introduced into the shaping material or the plasticized material in accordance with a relative movement speed between the nozzle unit and the stage in the moving step.

4. The method for manufacturing a three-dimensional shaped object according to claim 1, wherein
    the plasticizing step includes, in the plasticizing apparatus that includes a heater configured to heat the flat screw or the facing portion, a step of guiding the shaping material supplied between the flat screw and the facing portion to the communication hole while plasticizing the shaping material by rotation of the flat screw and heating of the heater.

5. The method for manufacturing a three-dimensional shaped object according to claim 4, wherein
    the flat screw has a through hole that is opened in the groove forming surface and that communicates with the communication hole.

6. The manufacturing method according to claim 5, further comprising:
    a pressure control step of controlling a pressure in the through hole to be higher than a pressure in the communication hole.

7. The method for manufacturing a three-dimensional shaped object according to claim 1, wherein
    the discharge amount control mechanism is driven by a motor, and
    the fiber introducing step includes a step of transmitting a driving force generated by the motor to a conveying unit of the second fiber material and using the driving force as a conveying force to convey the second fiber material.

8. A three-dimensional shaping apparatus, comprising:
    a plasticizing unit configured to plasticize at least a part of a shaping material including a first fiber material and a thermoplastic resin to generate a plasticized material for shaping a three-dimensional shaped object, the plasticizing unit includes a flat screw having a groove forming surface in which a groove portion is formed, a facing portion that has a facing surface facing the groove forming surface and that is formed with a communication hole communicating with a nozzle opening, at least one of the groove forming surface and the facing surface comprises an introduction groove, the introduction groove of the groove forming surface being a groove separate from the groove portion;

a discharging unit having the nozzle opening for discharging the plasticized material;

a fiber introducing unit having a function of introducing a second fiber material longer than the first fiber material into the shaping material before being discharged from the nozzle opening, the fiber introducing unit being configured to introduce the second fiber material into the shaping material through the introduction groove that guides the second fiber material from a side of the flat screw or the facing portion to the communication hole;

a discharge amount control mechanism that is provided upstream from the nozzle opening and that is configured to control a discharge amount of the plasticized material, the discharge amount control mechanism comprising a valve that rotates about an axis intersecting a direction in which an introduction flow path extends and a cutter blade provided in the introduction flow path that delivers the plasticized material to the nozzle opening and a rod located downstream of the valve and disposed in a branch flow path connected to the introduction flow path, the branch flow path extending along a direction intersecting the direction in which the introduction flow path extends; and a control unit configured to control the plasticizing unit, the discharging unit, the discharge amount control mechanism, and the fiber introducing unit to shape the three-dimensional shaped object including the first fiber material and the second fiber material.

* * * * *